(12) United States Patent
Vanbesien et al.

(10) Patent No.: US 8,741,042 B2
(45) Date of Patent: Jun. 3, 2014

(54) PHASE CHANGE INKS COMPRISING LINEAR PRIMARY ALCOHOLS

(71) Applicant: Xerox Corporation, Norwalk, CT (US)

(72) Inventors: Daryl W. Vanbesien, Burlington (CA); Caroline M. Turek, Mississauga (CA); Nathan Mark Bamsey, Burlington (CA); Corey L. Tracy, Calgary (CA); Naveen Chopra, Oakville (CA); Jennifer L. Belelie, Oakville (CA); Gabriel Iftime, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/662,493

(22) Filed: Oct. 28, 2012

(65) Prior Publication Data

US 2014/0118436 A1    May 1, 2014

(51) Int. Cl.
    *C09D 11/02* (2014.01)

(52) U.S. Cl.
    USPC .................................. 106/31.29; 106/31.61

(58) Field of Classification Search
    CPC ...................................................... C09D 11/34
    USPC .......................................... 106/31.29, 31.61
    See application file for complete search history.

(56) References Cited

U.S. PATENT DOCUMENTS

| | | | |
|---|---|---|---|
| 4,490,731 A | 12/1984 | Vaught | |
| 4,889,560 A | 12/1989 | Jaeger et al. | |
| 4,889,761 A | 12/1989 | Titterington et al. | |
| 5,195,430 A | 3/1993 | Rise | |
| 5,221,335 A | 6/1993 | Williams et al. | |
| 5,372,852 A | 12/1994 | Titterington et al. | |
| 5,389,958 A | 2/1995 | Bui et al. | |
| 5,621,022 A | 4/1997 | Jaeger et al. | |
| 6,547,380 B2 | 4/2003 | Smith et al. | |
| 7,973,186 B1 | 7/2011 | Goredema et al. | |
| 8,287,632 B1 | 10/2012 | Morimitsu et al. | |
| 8,372,189 B2 | 2/2013 | Chopra et al. | |
| 2007/0119338 A1* | 5/2007 | Breton et al. | 106/31.29 |
| 2007/0119340 A1* | 5/2007 | Breton et al. | 106/31.43 |
| 2011/0177245 A1* | 7/2011 | Dalal et al. | 427/256 |
| 2012/0272861 A1 | 11/2012 | Morimitsu et al. | |
| 2012/0272865 A1 | 11/2012 | Morimitsu et al. | |
| 2012/0274699 A1 | 11/2012 | Belelie et al. | |

OTHER PUBLICATIONS

Chopra, et al., U.S. Appl. No. 13/456,619, filed Apr. 26, 2012, "Phase Change Ink Compositions Comprising Crystalline Diurethanes and Derivatives Thereof," not yet published, 37 paages.

Jennifer L.Belelie, et al., U.S. Appl. No. 13/456,805, filed Apr. 26, 2012, "Phase Change Inks Comprising Organic Pigments," not yet published, 41 pages.

Morimitsu, et al. U.S. Appl. No. 13/456,916, filed Apr. 26, 2012, "Phase Change Ink Compositions Comprising Aromatic Ethers," not yet published, 40 pages.

Morimitsu et al., U.S. Appl. No. 13/457,221 filed Apr. 26, 2013, "Phase Change Inks Comprising Crystalline Amides," not yet published, 39 pages.

Morimitsu, et al. U.S. Appl. No. 13/457,323, filed Apr. 26, 2012, "Phase Change Ink Compositions Comprising Crystalline Sulfone Compounds and Derivatives Thereof," not yet published, 42 pages.

* cited by examiner

*Primary Examiner* — Veronica F Faison
(74) *Attorney, Agent, or Firm* — Marylou J. Lavoie

(57) ABSTRACT

A phase change ink comprising an amorphous compound; a crystalline compound; an optional dispersant; an optional synergist; an optional colorant; and an alcohol having a long alkyl chain containing from about 10 to about 80 carbon atoms.

20 Claims, 7 Drawing Sheets

PHASE CHANGE INKS COMPRISING LINEAR PRIMARY ALCOHOLS

BACKGROUND

Disclosed herein are phase change inks comprising linear primary alcohols having improved image robustness.

In general, phase change inks (sometimes referred to as solid inks or "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes.

The colorants can also include pigments, as disclosed in, for example, U.S. Pat. No. 5,221,335, the disclosure of which is totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Ink jetting devices are known in the art, and thus extensive description of such devices is not required herein. As described in U.S. Pat. No. 6,547,380, which is hereby incorporated herein by reference in its entirety, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, which is hereby incorporated herein by reference in its entirety, the image is applied by jetting appropriately colored inks during four to eighteen rotations (incremental movements) of a substrate (an image receiving member or intermediate transfer member) with respect to the ink jetting head, i.e., there is a small translation of the print head with respect to the substrate in between each rotation. This approach simplifies the print head design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

As noted, ink jet printing processes may employ inks that are solid at room temperature and liquid at elevated temperatures. For example, U.S. Pat. No. 4,490,731, which is hereby incorporated by reference herein, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of non-printing without the danger of nozzle clogging, even without capping the nozzles.

Examples of the phase change inks herein are inks that include an ink vehicle that is solid at temperatures of about 23° C. to about 27° C., for example room temperature, and specifically are solid at temperatures below about 60° C. However, the inks change phase upon heating, and are in a molten state at jetting temperatures. Thus, the inks have a viscosity of from about 1 to about 20 centipoise (cp), for example from about 5 to about 15 cp or from about 8 to about 12 cp, at an elevated temperature suitable for ink jet printing, for example temperatures of from about 60° C. to about 150° C.

In this regard, the inks herein may be either low energy inks or high energy inks. Low energy inks are solid at a temperature below about 40° C. and have a viscosity of from about 1 to about 20 centipoise such as from about 5 to about 15 centipoise, for example from about 8 to about 12 cp, at a jetting temperature of from about 60° C. to about 100° C. such as about 80° C. to about 100° C., for example from about 90° C. to about 100° C. High energy inks are solid at a temperature below 40° C. and have a viscosity of from about 5 to about 15 centipoise at a jetting temperature of from about 100° C. to about 180° C., for example from 120° C. to about 160° C. or from about 125° C. to about 150° C.

U.S. patent application Ser. No. 13/456,805 of Belelie et al., entitled "Phase Change Inks Comprising Organic Pigments," which is hereby incorporated by reference herein in its entirety, describes in the Abstract thereof a solid ink composition suitable for ink jet printing, including printing on coated paper substrates. In particular, the solid ink composition comprises a crystalline compound, an amorphous compound, and an organic pigment, which provides for a robust and fast crystallizing ink.

U.S. patent application Ser. No. 13/456,805 entitled "Phase Change Inks Comprising Organic Pigments," which is hereby incorporated by reference herein in its entirety, describes in the Abstract thereof a solid ink composition suitable for ink jet printing, including printing on coated paper substrates. In particular, the solid ink composition comprises a crystalline compound, an amorphous compound, and an organic pigment, which provides for a robust and fast crystallizing ink.

Previous pigment based crystalline-amorphous inks have demonstrated accelerated crystallization rates and improved lightfastness (relative to dye based inks). However, these inks still require improvement in fold crease and room exists for further enhancement in scratch resistance on coated substrates. It would be advantageous to have a pigment based solid ink design that further improves robustness.

While conventional solid ink technology is generally successful in producing vivid images and providing economy of jet use and substrate latitude on porous papers, such technology has not been satisfactory for coated substrates. Thus, while known compositions and processes are suitable for their intended purposes, a need remains for additional means for forming images or printing on coated paper substrates. As such, there is a need to find alternative compositions for solid ink compositions and future printing technologies to provide customers with excellent image quality on all substrates. There is further a need to provide such solid ink compositions which are suitable for fast printing environments like production printing. There is further a need for an improved phase change ink containing dispersed organic colored pigments and which display an improved crystallization rate. Further, a need remains for an improved phase change ink providing an improved crystallization rate and lightfastness (relative to dye based inks) along with an improvement in fold crease and further enhancement in scratch resistance on coated substrates. It would be further advantageous to have a pigment based phase change ink that provides improved robustness.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change ink comprising an amorphous compound; a crystalline compound; an optional dispersant; an optional synergist; an optional colorant; and an alcohol having a long alkyl chain containing from about 10 to about 80 carbon atoms.

Also described is an ink jet printer stick or pellet containing a phase change ink composition comprising an amorphous compound; a crystalline compound; an optional dispersant; an optional synergist; an optional colorant; and an alcohol having a long alkyl chain containing from about 10 to about 80 carbon atoms.

Also described is a method comprising incorporating into an ink jet printing apparatus a phase change ink composition comprising an amorphous compound; a crystalline compound; an optional dispersant; an optional synergist; an optional colorant; and an alcohol having a long alkyl chain containing from about 10 to about 80 carbon atoms; melting the ink composition; and causing droplets of the melted ink to be ejected in an imagewise pattern onto a substrate.

DETAILED DESCRIPTION

Figure 1:
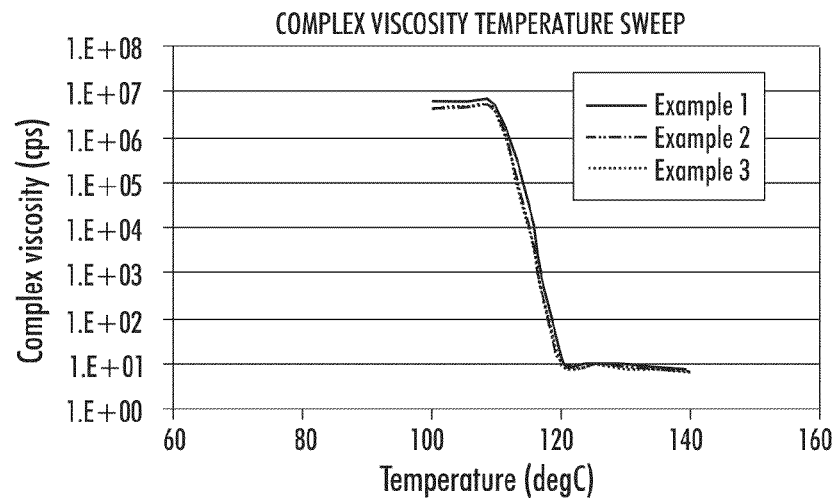
FIG. 1 is a graph showing complex viscosity (centipoise, y-axis) versus temperature (° C., x-axis) for a control pigmented phase change ink and for two pigmented phase change inks in accordance with the present disclosure.

A phase change ink is provided comprising an amorphous compound; a crystalline compound; an optional dispersant; an optional synergist; an optional colorant; and an alcohol having a long alkyl chain containing from about 10 to about 80 carbon atoms. In embodiments, the alcohol contains a long alkyl chain having from about 15 to about 60 carbon atoms, or from about 20 to about 55 carbon atoms.

The Alcohol.

The alcohol can be linear or branched, substituted or unsubstituted, saturated or unsaturated.

In embodiments, the alcohol contains a proportion of non-functionalized materials. In embodiments, the alcohol contains an alkyl group and the alkyl group can be selected from linear, branched, saturated, unsaturated, cyclic, substituted, and unsubstituted alkyl groups, and hetero atoms, such as oxygen, nitrogen, sulfur, silicon, boron, phosphorus, and the like may optionally be present in the alkyl group; an aryl group including unsubstituted and substituted aryl groups, and wherein hetero atoms, such as oxygen, nitrogen, sulfur, silicon, phosphorus, and the like may optionally be present in the aryl group; an alkylaryl group, including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like may optionally be present in either or both of the alkyl portion and the aryl portion of the alkylaryl group; an arylalkyl group, including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like may optionally be present in either or both of the alkyl portion and the aryl portion of the arylalkyl group; provided that the alcohol contains at least one long alkyl chain having from about 10 to about 80 carbon atoms, or from about 15 to about 60 carbon atoms, or from about 20 to about 55 carbon atoms.

In embodiments, the alcohol can be a primary alcohol or a secondary alcohol. In certain embodiments, the alcohol is a linear primary alcohol.

In embodiments, the phase change ink comprises an amorphous compound; a crystalline compound; an optional dispersant; an optional synergist; an optional colorant; and a linear primary alcohol of the formula

R—CH$_2$—OH wherein R is an alkyl group having from about 10 to about 80 carbon atoms, or from about 15 to about 60 carbon atoms, or from about 20 to about 55 carbon atoms. In embodiments, R—CH$_2$—OH is an alcohol having a specific carbon chain length, in embodiments wherein R is an alkyl group having from about 10 to about 80 carbon atoms, or from about 15 to about 60 carbon atoms, or from about 20 to about 55 carbon atoms. In other embodiments, R—CH$_2$—OH is an alcohol mixture having a combination of alcohols selected from alcohols of the formula R—CH$_2$—OH and wherein for each alcohol in the mixture R is an independently selected alkyl group having from about 10 to about 80 carbon atoms, or from about 15 to about 60 carbon atoms, or from about 20 to about 55 carbon atoms. In embodiments, the alcohol is a linear primary alcohol having a long alkyl chain containing from about 15 to about 60 carbon atoms or from about 20 to about 55 carbon atoms.

As used herein, the term "alkyl" refers to an aliphatic hydrocarbon group. The alkyl moiety may be a "saturated alkyl" group, which means that it does not contain any alkene or alkyne moieties. The alkyl moiety may also be an "unsaturated alkyl" moiety, which means that it contains at least one alkene or alkyne moiety. An "alkene" moiety refers to a group consisting of at least two carbon atoms and at least one carbon-carbon double bond, and an "alkyne" moiety refers to a group consisting of at least two carbon atoms and at least one carbon-carbon triple bond. The alkyl moiety, whether saturated or unsaturated, may be branched, straight chain, or cyclic.

In embodiments, the alkyl group may be substituted or unsubstituted. When substituted, any group(s) besides hydrogen can be the substituent group(s). When substituted, the substituent group(s) is(are) one or more group(s) individually and independently selected from the following non-limiting illustrative list: alkyl, cycloalkyl, hydroxy, alkoxy, cyano, halo, and amino, including mono- and di-substituted amino groups. Typical alkyl groups include, but are in no way limited to, methyl, ethyl, propyl, isopropyl, butyl, isobutyl, tertiary butyl, pentyl, hexyl, ethenyl, propenyl, butenyl, cyclopropyl, cyclobutyl, cyclopentyl, cyclohexyl, and the like. Each substituent group may be further substituted.

The term "aryl," as used herein, alone or in combination, means a carbocyclic aromatic system containing one, two or three rings wherein such rings may be attached together in a pendent manner or may be fused. The term "aryl," embraces aromatic radicals such as benzyl, phenyl, naphthyl, anthracenyl, and biphenyl.

The term "arylalkyl" as used herein, alone or in combination, refers to an aryl group attached to the parent molecular moiety through an alkyl group. The term "alkanediyl" refers to a divalent radical of an alkane group. Such alkanediyl has a general formula —Cn(RxRy)n-, where each Rx and Ry are independently a lower alkyl group or hydrogen.

In embodiments, the linear primary alcohol has a melting point of from about 65 to about 140° C., or from about 70 to about 130° C., or from about 75 to about 120° C. Melting point can be measured by any suitable or desired method. For example, the melting point can be measured using differential scanning calorimetry (DSC).

In embodiments, the linear primary alcohol has a viscosity at 150° C. of from about 1 to about 20, or from about 1 to about 10, or from about 3 to about 8 centipoise. Viscosity can be measured by any suitable or desired method. For example, viscosity can be measured using the method described in ASTM-D-3236.

In embodiments, the linear primary alcohol has a hydroxyl number of from about 30 to about 180 mg KOH/g sample, 55 to about 150 mg KOH/g sample, or from about 60 to about 140 mg KOH/g sample, or from about 65 to about 130 mg KOH/g sample. Hydroxyl number can be measured by any suitable or desired method. For example, hydroxy number can be measured using the method described in ASTM-E-222.

In embodiments, linear primary alcohol suitable for use in the present phase change ink can be selected from the Unilin™ alcohol series including Unilin™350 alcohol, Unilin™425 alcohol, Unilin™ 550 alcohol, and Unilin™ 700 alcohol. Properties of selected Unilin™ alcohol suitable for use in the present phase change inks are provided in Table 1. For further detail, see http://www.bakerhughes.com/news-and-media/resources/technical-data-sheet/unilin-alcohols.

TABLE 1

| Product | Melting Point (° C.) | Viscosity at 150° C. (centipoise) | Hydroxyl Number (mg KOH/g sample) |
| --- | --- | --- | --- |
| | | Test Method | |
| | DSC | ASTM D-3226 | ASTM E-222 |
| Unilin ™ 350 alcohol | 78 | 3 | 129 |

TABLE 1-continued

| Product | Melting Point (° C.) Test Method DSC | Viscosity at 150° C. (centipoise) ASTM D-3226 | Hydroxyl Number (mg KOH/g sample) ASTM E-222 |
|---|---|---|---|
| Unilin ™ 425 alcohol | 91 | 4 | 100 |
| Unilin ™ 550 alcohol | 99 | 6 | 83 |
| Unilin ™ 700 alcohol | 105 | 8 | 65 |

Solid ink technology broadens printing capability and customer base across many markets, and the diversity of printing applications will be facilitated by effective integration of printhead technology, print process and ink materials. The solid ink compositions are characterized by being solid at room temperature (RT) (e.g., 20-27° C.) and molten at an elevated temperature at which the molten ink is applied to a substrate. While current ink options are successful for porous paper substrates, these options are not always satisfactory for coated paper substrates.

It was previously discovered that using a mixture of crystalline and amorphous small molecule compounds in solid ink formulations provides robust inks, and in particular, solid inks which demonstrate robust images on coated paper. See U.S. patent application Ser. No. 13/095,636 entitled "Solid Ink Compositions Comprising Crystalline-Amorphous Mixtures" of Jennifer L. Belelie et al., filed Apr. 27, 2011, which is hereby incorporated by reference herein in its entirety. Print samples made with such phase change inks demonstrate better robustness with respect to scratch, fold, and fold offset as compared to currently available phase change inks.

Using this approach is surprising, however, due to the known properties of crystalline or amorphous materials. For crystalline materials, small molecules generally tend to crystallize when solidifying and low molecular weight organic solids are generally crystals. While crystalline materials are generally harder and more resistant, such materials are also much more brittle, so that printed matter made using a mainly crystalline ink composition is fairly sensitive to damage. For amorphous materials, high molecular weight amorphous materials, such as polymers, become viscous and sticky liquids at high temperature, but do not show sufficiently low viscosity at high temperatures. As a result, the polymers cannot be jetted from print head nozzles at desirable jetting temperature (about 140° C.).

It was further previously discovered that a robust solid ink can be obtained through a blend of crystalline and amorphous compounds. See U.S. patent application Ser. No. 13/456,805 entitled "Phase Change Inks Comprising Organic Pigments" of Jennifer L. Belelie et al., filed Apr. 26, 2012, which is hereby incorporated by reference herein in its entirety.

The present phase change inks provide improved printed image robustness, particularly on coated substrates. In embodiments, the scratch and fold crease characteristics of the present phase change inks, in embodiments, pigmented phase change inks, are significantly improved by the incorporation of linear primary alcohols such as those available from Baker Hughes under the trade name Unilin™. The enhanced fold crease and scratch resistance provided herein is a key enabler for next generation robust inks.

In embodiments, the present phase change ink compositions include a blend of (1) crystalline compounds and (2) amorphous compounds, generally in a weight ratio of from about 60:40 to about 95:5, respectively. In more specific embodiments, the weight ratio of the crystalline to amorphous compound is from about 65:35 to about 95:5, or from about 70:30 to about 90:10, or from about 70:30 to about 80:20. In other embodiments, the crystalline and amorphous compounds are blended in a weight ratio of from about 1.5 to about 20, or from about 2.0 to about 10, respectively.

Each compound or component imparts specific properties to the solid inks, and the resulting inks incorporating a blend of these amorphous and crystalline compounds demonstrate excellent robustness on uncoated and coated substrates. The crystalline compound in the ink formulation drives the phase change through rapid crystallization on cooling. The crystalline compound also sets up the structure of the final ink film and creates a hard ink by reducing the tackiness of the amorphous compound. The amorphous compounds provide tackiness and impart robustness to the printed ink.

The Amorphous Compound.

As used herein, the term "alkyl" refers to an aliphatic hydrocarbon group. The alkyl moiety may be a "saturated alkyl" group, which means that it does not contain any alkene or alkyne moieties. The alkyl moiety may also be an "unsaturated alkyl" moiety, which means that it contains at least one alkene or alkyne moiety. An "alkene" moiety refers to a group consisting of at least two carbon atoms and at least one carbon-carbon double bond, and an "alkyne" moiety refers to a group consisting of at least two carbon atoms and at least one carbon-carbon triple bond. The alkyl moiety, whether saturated or unsaturated, may be branched, straight chain, or cyclic.

The alkyl group of the amorphous compound may have 1 to 40 carbon atoms (whenever it appears herein, a numerical range such as "1 to 40" refers to each integer in the given range; e.g., "1 to 40 carbon atoms" means that the alkyl group may consist of 1 carbon atom, 2 carbon atoms, 3 carbon atoms, etc., up to and including 40 carbon atoms, although the present definition also covers the occurrence of the term "alkyl" where no numerical range is designated). The alkyl group may also be a medium size alkyl having 1 to 10 carbon atoms. The alkyl group could also be a lower alkyl having 1 to 4 carbon atoms. The alkyl group of the compounds herein may be designated as "C1-C5 alkyl" or similar designations. By way of example only, "C1-C4 alkyl" indicates that there are one to four carbon atoms in the alkyl chain, i.e., the alkyl chain is selected from the group consisting of methyl, ethyl, propyl, iso-propyl, n-butyl, iso-butyl, sec-butyl, and t-butyl. The alkyl group may be substituted or unsubstituted. When substituted, any group(s) besides hydrogen can be the substituent group(s). When substituted, the substituent group(s) is(are) one or more group(s) individually and independently selected from the following non-limiting illustrative list: alkyl, cycloalkyl, hydroxy, alkoxy, cyano, halo, and amino, including mono- and di-substituted amino groups. Typical alkyl groups include, but are not limited to, methyl, ethyl, propyl, isopropyl, butyl, isobutyl, tertiary butyl, pentyl, hexyl, ethenyl, propenyl, butenyl, cyclopropyl, cyclobutyl, cyclopentyl, cyclohexyl, and the like. Each substituent group may be further substituted.

The term "aryl," as used herein, alone or in combination, means a carbocyclic aromatic system containing one, two or three rings wherein such rings may be attached together in a pendent manner or may be fused. The term "aryl," embraces aromatic radicals such as benzyl, phenyl, naphthyl, anthracenyl, and biphenyl.

The term "arylalkyl" as used herein, alone or in combination, refers to an aryl group attached to the parent molecular moiety through an alkyl group.

In embodiments, the amorphous compound may comprise an ester of tartaric acid of Formula I or an ester of citric acid of Formula II shown below:

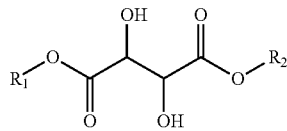

Formula I

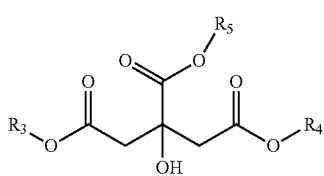

Formula II wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group, and mixtures thereof.

In certain embodiments, each $R_1$, $R_2$, $R_3$, $R_4$, and $R_5$ is independently a cyclohexyl group optionally substituted with one or more alkyl groups selected from methyl, ethyl, n-propyl, isopropyl, n-butyl and t-butyl. In certain embodiments, each $R_1$, $R_2$, $R_3$, $R_4$, and $R_5$ is independently a cyclohexyl group optionally substituted with one or more alkyl groups selected from methyl, ethyl, n-propyl, isopropyl, n-butyl and t-butyl.

Referring to Formula I, in certain embodiments, one of $R_1$ and $R_2$ is 2-isopropyl-5-methylcyclohexyl, and the other one of $R_1$ and $R_2$ is 2-isopropyl-5-methylcyclohexyl, 4-t-butylcyclohexyl, or cyclohexyl, or one of $R_1$ and $R_2$ is 4-t-butylcyclohexyl, and the other one of $R_1$ and $R_2$ is cyclohexyl. In certain embodiment, $R_1$ and $R_2$ are each 2-isopropyl-5-methylcyclohexyl. In certain embodiment, $R_1$ is 2-isopropyl-5-methylcyclohexyl and $R_2$ is 4-t-butylcyclohexyl. In certain embodiment, $R_1$ is 2-isopropyl-5-methylcyclohexyl and $R_2$ is cyclohexyl. In certain embodiment, $R_1$ is 4-t-butylcyclohexyl and $R_2$ is cyclohexyl.

Referring to Formula II, in certain embodiments, one of $R_3$, $R_4$ and $R_5$ is 2-isopropyl-5-methylcyclohexyl, and the other one of $R_3$, $R_4$ and $R_5$ is 2-isopropyl-5-methylcyclohexyl, 4-t-butylcyclohexyl, or cyclohexyl, or one of $R_3$, $R_4$ and $R_5$ is 4-t-butylcyclohexyl, and the other one of $R_3$, $R_4$ and $R_5$ is cyclohexyl. In certain embodiment, $R_3$, $R_4$ and $R_5$ are each 2-isopropyl-5-methylcyclohexyl. In certain embodiment, $R_3$ is 2-isopropyl-5-methylcyclohexyl and $R_4$ and $R_5$ are each 4-t-butylcyclohexyl. In certain embodiment, $R_3$ is 2-isopropyl-5-methylcyclohexyl and $R_4$ and $R_5$ are each cyclohexyl. In certain embodiment, $R_3$ is 4-t-butylcyclohexyl and $R_4$ and $R_5$ are each cyclohexyl.

Some suitable amorphous materials are disclosed in U.S. patent application Ser. No. 13/095,784 to Morimitsu et al., which is hereby incorporated by reference in its entirety. The amorphous materials may comprise an ester of tartaric acid having a formula of

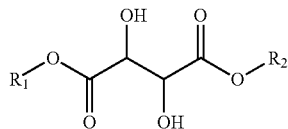

wherein $R_1$ and $R_2$ each, independently of the other or meaning that they can be the same or different, is selected from the group consisting of alkyl group, wherein the alkyl portion can be straight, branched or cyclic, saturated or unsaturated, substituted or unsubstituted, having from about 1 to about 40 carbon atoms or a substituted or unsubstituted aromatic or heteroaromatic group, and mixtures thereof. In certain embodiments, each $R_1$ and $R_2$ is independently a cyclohexyl group optionally substituted with one or more alkyl group(s) selected from methyl, ethyl, n-propyl, isopropyl, n-butyl and t-butyl. In certain embodiments, $R_1$ and $R_2$ are each 2-isopropyl-5-methylcyclohexyl.

The tartaric acid backbone is selected from L-(+)-tartaric acid, D-(−)-tartaric acid, DL-tartaric acid, or mesotartaric acid, and mixtures thereof. Depending on the R groups and the stereochemistries of tartaric acid, the esters can form crystals or stable amorphous compounds. In specific embodiments, the amorphous compound is selected from the group consisting of di-L-menthyl L-tartrate, di-DL-menthyl L-tartrate (DMT), di-L-menthyl DL-tartrate, di-DL-menthyl DL-tartrate, and any stereoisomers and mixtures thereof.

The amorphous compound may comprise an ester of citric acid disclosed in U.S. patent application Ser. No. 13/095,795 to Morimitsu et al., which is hereby incorporated by reference in its entirety. These amorphous materials are synthesized by an esterification reaction of citric acid. In particular, citric acid was reacted with a variety of alcohols to make tri-esters according to the synthesis scheme shown in U.S. patent application Ser. No. 13/095,795. The amorphous compounds are synthesized by an esterification reaction of tartaric acid.

These materials show relatively low viscosity (<$10^2$ centipoise (cps), or from about 1 to about 100 cps, or from about 5 to about 95 cps) near the jetting temperature (≤140° C., or from about 100 to about 140° C., or from about 105 to about 140° C.) but very high viscosity (>$10^5$ cps) at room temperature.

In particular, di-DL-menthyl L-tartrate (DMT) was found to be especially suitable for use as an amorphous compound in the present ink embodiments.

To synthesize the amorphous component, tartaric acid was reacted with a variety of alcohols to make di-esters as shown in the synthesis scheme shown in U.S. patent application Ser. No. 13/095,784. A variety of alcohols may be used in the esterification such as, for example, menthol, isomenthol, neomenthol, isoneomenthol and any stereoisomers and mixtures thereof. Mixtures of aliphatic alcohols may be used in the esterification. For example, a mixture of two aliphatic alcohols may be used in the esterification. The molar ratios of the aliphatic alcohols may be from 25:75 to 75:25, from 40:60 to 60:40, or about 50:50. Examples of suitable aliphatic alcohol whose mixtures form amorphous compounds when reacted with tartaric acid include cyclohexanol and substituted cyclohexanol (e.g., 2-, 3-, or 4-tert-butyl-cyclohexanol). In embodiments, two or more molar equivalents of alcohol may be used in the reaction to produce the di-esters of tartaric acid. If one molar equivalent of alcohol is used, the result is mostly mono-esters.

In certain embodiments, the amorphous compound comprises bis(2-isopropyl-5-methylcyclohexyl) L-tartrate or (4-t-butylcyclohexyl)-(cyclohexyl)-L-tartrate, Di-DL-menthyl L-tartrate, and any stereoisomers.

Other suitable amorphous components include those disclosed in U.S. patent application Ser. No. 13/095,795 to Morimitsu et al., which is hereby incorporated by reference in its entirety. The amorphous materials may comprise a compound having the following structure:

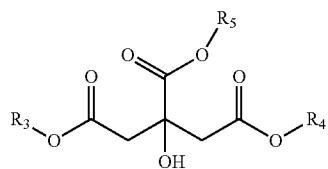

wherein $R_3$, $R_4$ and $R_5$ are independently an alkyl group, wherein the alkyl can be straight, branched or cyclic, saturated or unsaturated, substituted or unsubstituted, having from about 1 to about 40 carbon atoms, or an substituted or unsubstituted aromatic or heteroaromatic group, and mixtures thereof. In particular, tri-DL-menthyl citrate (TMC) is a desirable amorphous candidate which affords suitable thermal and rheological properties as well imparts robustness to the print images.

These amorphous materials are synthesized by an esterification reaction of citric acid. In particular, citric acid was reacted with a variety of alcohols to make tri-esters according to the synthesis scheme disclosed therein. In embodiments, the phase change ink composition is obtained by using amorphous compounds synthesized from citric acid and at least one alcohol in an esterification reaction.

In embodiments, the amorphous compound may comprise a diurethane compound having a formula of:

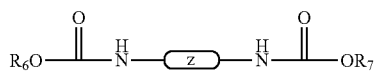

Formula III wherein Z is selected from the group consisting of:

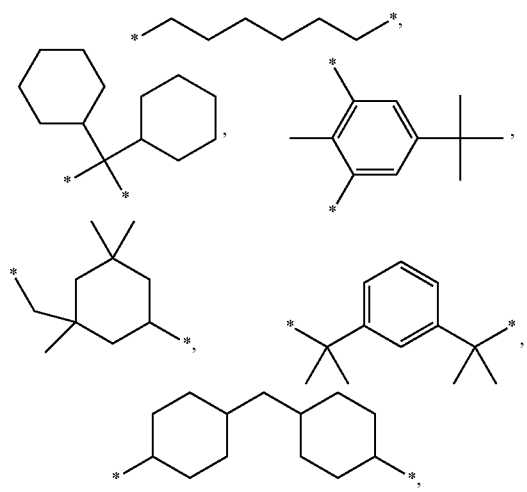

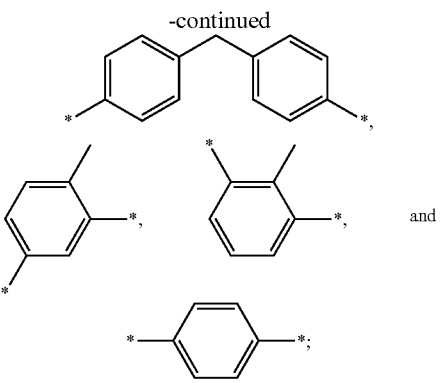

wherein Z can be attached to either side of the nitrogen atom of the diurethane formula through the bond labeled with *; each $R_6$ and $R_7$ is i) an alkyl group wherein the alkyl can be linear or branched having from about 1 to about 8 carbon atoms, or ii) an aryl group; with the proviso that when Z is —$(CH_2)_6$—, both $R_6$ and $R_7$ are not —$(CH_2)_n$—$C_6H_5$ wherein n=0-4. Each $R_6$ and $R_7$ can be any linear or branched alkyl including methyl, ethyl, propyl, (n-, iso-, sec- and t-) butyl, (n-, iso-, t- and the like) pentyl, (n-, iso-, t- and the like) hexyl, (n-, iso-, t- and the like) heptyl, or (n-, iso-, t- and the like) octyl.

In certain embodiments, $R_6$ and $R_7$ is independently selected from the group consisting of:

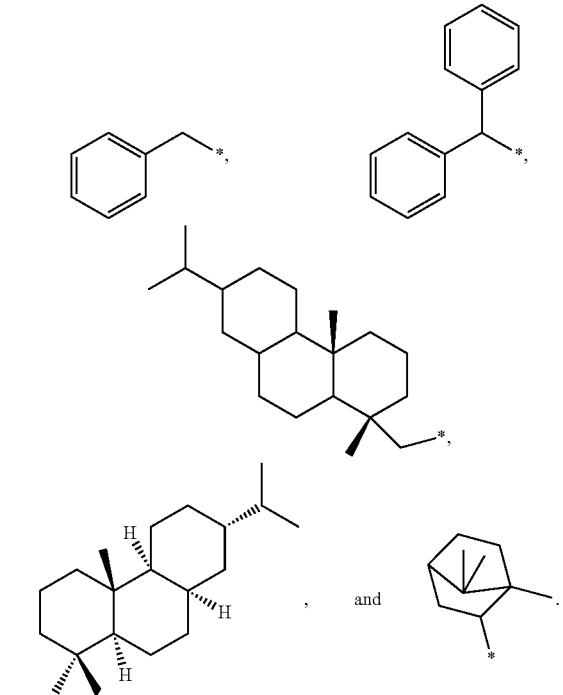

In certain embodiments, z is —$(CH_2)_6$— and both $R_6$ and $R_7$ are

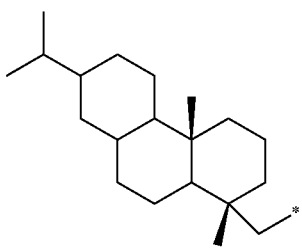 [SMILES: *C[C@@]1(C)CCC[C@@]2(C)C3CCC(C(C)C)CC3CCC12]

$R_6$ and $R_7$ can also be fused ring alcohols, hydroabietyl alcohol (e.g. rosin alcohols), isoborneol, and octyl phenol ethoxylate (such as Igepal® CA210, from Rhodia).

These materials show relatively low viscosity ($<10^2$ centipoise (cps), or from about 1 to about 100 cps, or from about 5 to about 95 cps) near the jetting temperature ($\leq 140°$ C., or from about 100 to about 140° C., or from about 105 to about 140° C.) but very high viscosity ($>10^5$ cps) at room temperature.

In embodiments, the amorphous compounds are formulated with a crystalline compound to form a solid ink composition. The ink compositions show good rheological profiles. Print samples created by the solid ink composition on coated paper by K-proof exhibit excellent robustness. Furthermore, using tartaric acid as an ester base has additional advantages of being low cost, and being obtained from a potential bio-derived source.

In embodiments, the solid ink composition is obtained by using novel amorphous compounds synthesized from tartaric acid and at least one alcohol in an esterification reaction. The solid ink composition comprises the amorphous compound in combination with a crystalline compound and a colorant. The present embodiments comprise a balance of amorphous and crystalline compounds to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the present esters of tartaric acid, which provide amorphous compounds for the solid inks, have been discovered to produce robust inks having desirable rheological profiles and that meet the many requirements for inkjet printing.

In embodiments, the amorphous material is present an amount of from about 5 percent to about 40 percent by weight, or from about 5 percent to about 35 percent by weight, or from about 10 percent to about 30 percent by weight of the total weight of the ink composition.

The Crystalline Compound.

The crystalline component may comprise amide, aromatic ester, linear diester, urethanes, sulfones, tartaric acid ester derivatives with aromatic groups, or mixtures thereof.

Suitable crystalline components include those disclosed in U.S. patent application Ser. No. 13/457,221 to Morimitsu et al., which is hereby incorporated by reference in its entirety. These crystalline materials comprise the following structure:

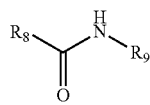

Formula IV wherein $R_8$ and $R_9$ can be the same or different, each $R_8$ and $R_9$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to about 40 carbon atoms, from about 6 to about 20 carbon atoms, or from about 6 to about 10 carbon atoms.

Suitable crystalline components include those disclosed in U.S. patent application Ser. No. 13/456,916 to Morimitsu et al., which is hereby incorporated by reference in its entirety. These crystalline materials comprise the following structure:

Formula V wherein $R_{10}$ and $R_{11}$ can be the same or different, and wherein each $R_{10}$ and $R_{11}$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms; (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to about 40 carbon atoms, or about 6 to about 20 carbon atoms, or from about 6 to about 10 carbon atoms, although the numbers can be outside of these ranges, and mixtures thereof, provided that at least one of $R_{10}$ and $R_{11}$ is an aromatic group; and p is 0 or 1.

Non-limited examples of crystalline aromatic ether include

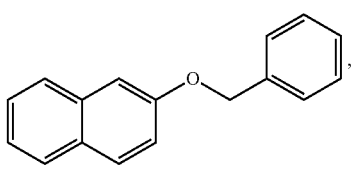

-continued

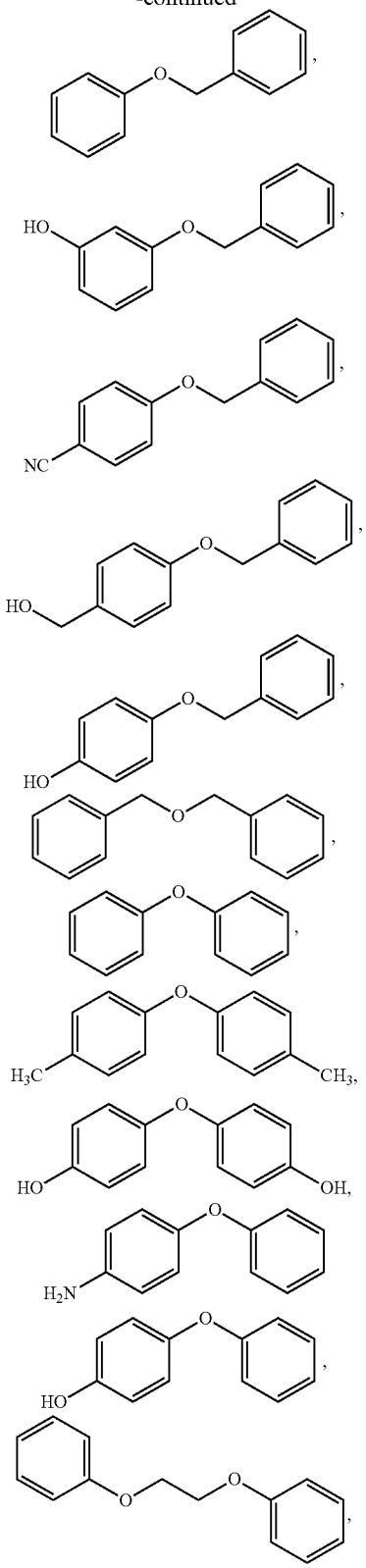

and mixtures thereof.

Suitable crystalline components include those disclosed in U.S. patent application Ser. No. 13/095,555 to Chopra et al., which is hereby incorporated by reference in its entirety. These crystalline materials comprise an ester of an aliphatic linear diacid having the following structure:

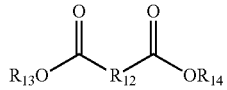

Formula VI wherein $R_{12}$ may be substituted or unsubstituted alkyl chain and is selected from the group consisting of —$(CH_2)_1$— to —$(CH_2)_{12}$—, and wherein $R_{13}$ and $R_{14}$, each independently of the other, is selected from the group consisting of a substituted or unsubstituted aromatic or heteroaromatic group, substituents including alkyl groups, wherein the alkyl portion can be straight, branched or cyclic.

Suitable crystalline components include those disclosed in U.S. patent application Ser. No. 13/456,619 to Chopra et al., which is hereby incorporated by reference in its entirety. These crystalline materials comprise diurethanes having the following structure:

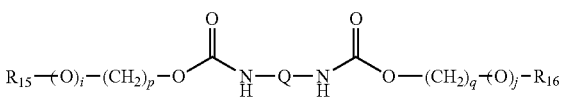

Formula VII wherein Q is alkanediyl; each $R_{15}$ and $R_{16}$ is independently phenyl or cyclohexyl optionally substituted with one or more alkyl; i is 0 or 1; j is 0 or 1; p is 1 to 4; q is 1 to 4. In certain of such embodiments, each $R_{15}$ and $R_{16}$ is independently phenyl or cyclohexyl optionally substituted with one or more methyl or ethyl. In certain of such embodiments, $R_{15}$ and $R_{16}$ is phenyl. In certain embodiments, Q is —$(CH_2)_n$— and n is 4 to 8. In certain of such embodiments, n is 6. In certain embodiments, each $R_{15}$ and $R_{16}$, is independently selected from benzyl, 2-phenylethyl, 2-phenoxyethyl, $C_6H_5(CH_2)_4$—, cyclohexyl, 2-methylcyclohexyl, 3-phenylpropanyl, 3-methylcyclohexyl, 4-methylcyclohexyl, cyclohexylmethyl, 2-methylcyclohexylmethyl, 3-methylcyclohexylmethyl, 4-methylcyclohexylmethyl, and 4-ethylcyclohexanyl.

Suitable crystalline components include those disclosed in U.S. patent application Ser. No. 13/457,323 to Morimitsu et al., which is hereby incorporated by reference in its entirety. These crystalline component being a sulfone compound having the following structure:

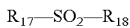

Formula VIII wherein $R_{17}$ and $R_{18}$ can be the same or different, and wherein $R_{17}$ and $R_{18}$ each, independently of the other is selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, although the numbers can be outside of these ranges, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms, although the numbers can be outside of these ranges; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to from about 40 carbon atoms, from about 6 to about 20 carbon atoms, or about 6 to about 10 carbon atoms, although the numbers can be outside of these ranges, and mixtures thereof.

In certain embodiments, each $R_{17}$ and $R_{18}$ is independently alkyl, or aryl, optionally substituted with one or more halo, amino, hydroxy, or cyano groups and combinations thereof, or $R_{17}$ and $R_{18}$ taken together with the S atom to which they are attached form a heterocyclic ring. In certain of such embodiments, each $R_{17}$ and $R_{18}$ is independently an optionally substituted alkyl, such as, methyl, ethyl, isopropyl, n-butyl, or t-butyl. In certain of such embodiments, each $R_6$ and $R_7$ is independently an optionally substituted aryl, such as, phenyl, or benzyl. In certain embodiments, each $R_{17}$ and $R_{18}$ is independently substituted with one or more amino, chloro, fluoro, hydroxy, cyano or combinations thereof. Substitution on the aryl groups may be made in the ortho, meta or para position of the phenyl groups and combinations thereof. In certain embodiments, each $R_{17}$ and $R_{18}$ is independently 2-hydroxyethyl, or cyanomethyl.

In certain embodiments, the crystalline component may include diphenyl sulfone, dimethyl sulfone, bis(4-hydroxyphenyl)sulfone, bis(4-aminophenyl)sulfone, bis(3-aminophenyl)sulfone, bis(4-chlorophenyl)sulfone, bis(4-fluorophenyl)sulfone, 2-hycroxyphenyl-4-hydroxyphenyl sulfone, phenyl-4-chlorophenyl sulfone, phenyl-2-aminophenyl sulfone, bis(3-amino-4-hydroxyphenyl)sulfone, dibenzyl sulfone, methylethyl sulfone, diethyl sulfone, methylisopropyl sulfone, ethylisopropyl sulfone, di-n-butyl sulfone, divinyl sulfone, methyl-2-hydroxymethyl sulfone, methylchloromethyl sulfone, sulfolane, 3-sulfolene, and mixtures thereof.

The crystalline compound may comprise an ester of tartaric acid of the following formula:

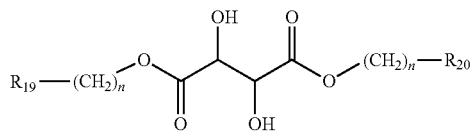

Formula IX wherein each $R_{19}$ and $R_{20}$ is independently an aryl or a heteroaryl optionally substituted with a lower alkyl and alkoxy, each n is independently 0 to 3. In certain embodiments, each $R_{19}$ and $R_{20}$ is independently an optionally substituted aryl, such as a phenyl. In certain embodiments, each $R_{19}$ and $R_{20}$ is independently not substituted, or substituted with methyl, ethyl, isopropyl, methoxy or ethyoxy. In certain embodiments, each $R_{19}$ and $R_{20}$ is independently a phenyl optionally substituted with methyl or methoxy.

In certain embodiments, each $R_{19}$ and $R_{20}$, independently is selected from the group consisting of

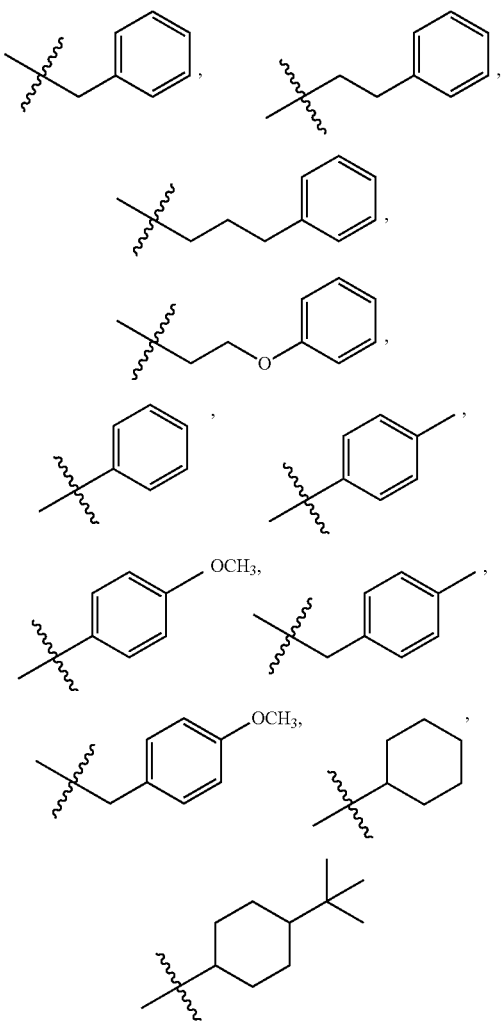

and mixtures thereof.

In certain embodiments, the tartaric acid backbone is selected from L-(+)-tartaric acid, D-(−)-tartaric acid, DL-tartaric acid, or mesotartaric acid, and mixtures thereof.

In certain embodiments, the crystalline compound is selected from the group consisting of dibenzyl L-tartrate, diphenethyl L-tartrate, bis(3-phenyl-1-propyl) L-tartrate, bis(2-phenoxyethyl) L-tartrate, diphenyl L-tartrate, bis(4-methylphenyl) L-tartrate, bis(4-methoxylphenyl) L-tartrate, bis(4-methylbenzyl) L-tartrate, bis(4-methoxylbenzyl) L-tartrate, and mixtures thereof.

In a specific embodiment, the phase change ink includes an amorphous compound comprising a first ester of tartaric acid of the formula

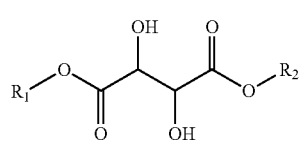

Formula I

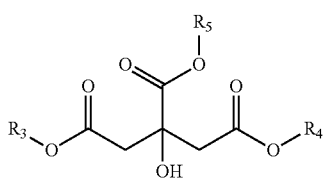

Formula II wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group, and mixtures thereof; and wherein the crystalline compound comprises a second ester of tartaric acid of the formula

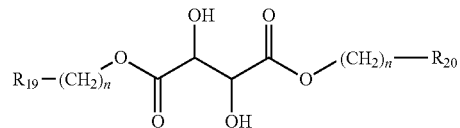

Formula IX wherein each $R_{19}$ and $R_{20}$ is independently an aryl or a heteroaryl optionally substituted with a lower alkyl and alkoxy, and each n is independently 0 to 3.

The crystalline materials show sharp crystallization, relatively low viscosity ($\leq 10^1$ centipoise (cps), or from about 0.5 to about 20 cps, or from about 1 to about 15 cps) at a temperature of about 140° C., but very high viscosity ($>10^6$ cps) at room temperature. These materials have a melting temperature ($T_{melt}$) of less than 150° C., or from about 65 to about 150° C., or from about 66 to about 145° C., and a crystallization temperature ($T_{crys}$) of greater than 60° C., or from about 60 to about 140° C., or from about 65 to about 120° C. The $\Delta T$ between $T_{melt}$ and $T_{crys}$ is less than about 55° C.

In embodiments, the crystalline material is present an amount of from about 60 percent to about 95 percent by weight, or from about 65 percent to about 95 percent by weight, or from about 70 percent to about 90 percent by weight of the total weight of the ink composition.

Colorant.

The phase change ink compositions can include any suitable or desired colorant such as colorants selected from the group consisting of traditional dyes, pigments, and mixtures and combinations thereof present in any suitable or desired amount. If more than one colorant is included, the total amount of colorant present in the phase change ink composition can be any desired or effective amount to obtain the desired color or hue, in embodiments from about 0.1 to about 50 percent, or from about 0.1 percent to about 20 percent total colorant by weight based on the total weight of the phase change ink composition.

Any desired or effective colorant can be employed in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon® Red 492 (BASF); Orasol® Red G (Pylam Products); Direct Brilliant Pink B (Oriental Giant Dyes); Direct Red 3BL (Classic Dyestuffs); Supranol® Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol® Brilliant Yellow 4GF (Clariant); Cibanone Yellow 2G (Classic Dyestuffs); Orasol® Black RLI (BASF); Orasol® Black CN (Pylam Products); Savinyl Black RLSN(Clariant); Pyrazol Black BG (Clariant); Morfast® Black 101 (Rohm & Haas); Diaazol Black RN (ICI); Thermoplast® Blue 670 (BASF); Orasol® Blue GN (Pylam Products); Savinyl Blue GLS (Clariant); Luxol Fast Blue MBSN (Pylam Products); Sevron Blue 5GMF (Classic Dyestuffs); Basacid® Blue 750 (BASF); Keyplast Blue (Keystone Aniline Corporation); Neozapon® Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen® Blue FF-4012 (BASF); Fastol® Black BR(C.I. Solvent Black 35) (Chemische Fabriek Triade BV); Morton Morplas Magenta 36 (C.I. Solvent Red 172); metal phthalocyanine colorants, such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are hereby incorporated by reference herein in their entireties, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint® Orange X-38, uncut Reactint® Blue X-17, Solvent Yellow 162, Acid Red 52, Solvent Blue 44, and uncut Reactint® Violet X-80.

In specific embodiments, the phase change ink compositions herein are pigmented phase change ink compositions. In embodiments, the pigment is selected from the group consisting of metal phthalocyanine, metal-free phthalocyanine, and mixtures and combinations thereof. In certain embodiments, the phase change ink composition includes a pigment selected from the group consisting of cyan, green, blue, black, carbon black, Pigment Blue, copper phthalocyanine, and mixtures and combinations thereof. In a specific embodiment, the pigment is a cyan pigment.

Suitable pigments that can be used in embodiments herein include, for example, PALIOGEN® Violet 5100 (commercially available from BASF); PALIOGEN® Violet 5890 (commercially available from BASF); HELIOGEN® Green L8730 (commercially available from BASF); LITHOL® Scarlet D3700 (commercially available from BASF); SUNFAST® Blue 15:4 (commercially available from Sun Chemical); HOSTAPERM® Blue B2G-D (commercially available from Clariant); HOSTAPERM® Blue B4G (commercially available from Clariant); Permanent Red P-F7RK; HOSTAPERM® Violet BL (commercially available from Clariant); LITHOL® Scarlet 4440 (commercially available from BASF); Bon Red® C (commercially available from Dominion Color Company); ORACET® Pink RF (commercially available from Ciba); PALIOGEN® Red 3871 K (commercially available from BASF); SUNFAST® Blue 15:3 (commercially available from Sun Chemical); PALIOGEN® Red 3340 (commercially available from BASF); SUNFAST® Carbazole Violet 23 (commercially available from Sun Chemical); LITHOL® Fast Scarlet L4300 (commercially available from BASF); SUNBRITE® Yellow 17 (commercially available from Sun Chemical); HELIOGEN® Blue L6900, L7020 (commercially available from BASF); SUNBRITE® Yellow 74 (commercially available from Sun Chemical); SPECTRA® PAC C Orange 16 (commercially available from Sun Chemical); HELIOGEN® Blue K6902, K6910 (commercially available from BASF); SUNFAST® Magenta 122 (commercially available from Sun Chemical); HELIOGEN® Blue D6840, D7080 (commercially available from BASF); Sudan Blue OS (commercially available from BASF); NEOPEN® Blue FF4012 (commercially available from BASF); PV Fast Blue B2GO1 (commercially available from Clariant); IRGALITE® Blue BCA (commercially available from Ciba); PALIOGEN® Blue 6470 (commercially available from BASF); Sudan Orange G (commercially available from Aldrich), Sudan Orange 220 (commercially available from BASF); PALIOGEN® Orange 3040 (BASF); PALIOGEN® Yellow 152, 1560 (commercially available from BASF); LITHOL® Fast Yellow 0991 K (commercially available from BASF); PALIOTOL® Yellow 1840 (commercially available from BASF); NOVOPERM® Yellow FGL (commercially available from Clariant); Ink Jet Yellow 4G VP2532 (commercially available from Clariant); Toner Yellow HG (commercially available from Clariant); Lumogen® Yellow D0790 (commercially available from BASF); Suco-Yellow L1250 (commercially available from BASF); Suco-Yellow D1355 (commercially available from BASF); Suco Fast Yellow D1 355, D1 351 (commercially available from BASF); HOSTAPERM® Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL® Pink D4830 (commercially available from BASF); CINQUASIA® Magenta (commercially available from DU PONT); PALIOGEN® Black L0084 (commercially available from BASF); Pigment Black K801 (commercially available from BASF); and carbon blacks such as REGAL® 330 (commercially available from Cabot), Nipex® 150 (commercially available from Degussa) Carbon Black 5250 and Carbon Black 5750 (commercially available from Columbia Chemical), and the like, as well as mixtures thereof.

The pigment can be provided in the phase change ink composition in any suitable or desired amount. In embodiments, the pigment can be present in an amount of from about 0.1 to about 20 percent, or from about 0.5 percent to about 5 percent, or about 0.75 to about 3 percent total pigment, based on the total weight of the phase change ink composition.

Synergist.

Any suitable or desired synergist can be employed. In embodiments, a copper phthalocyanine derivative is employed as a synergist for improving dispersion stability of pigmented phase change inks, in embodiments cyan solid inks. In embodiments, the synergist is a compound of the formula

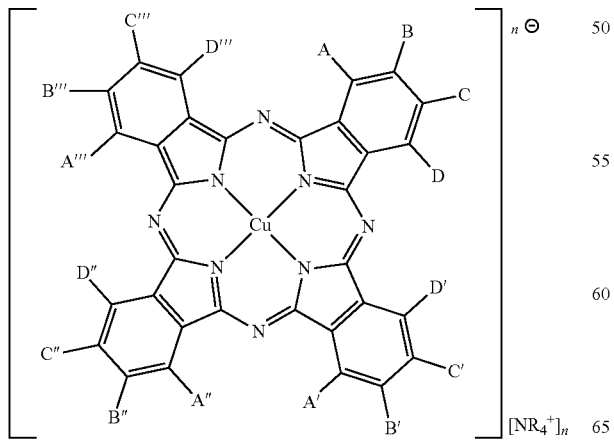

wherein at least one of A, B, C, and D, A', B', C', and D', A", B", C", and D", A''', B''', C''', and D''' are present, and wherein, B, C, and D, A', B', C', and D', A", B", C", and D", A''', B''', C''', and D''', are each independently selected from the group consisting of hydrogen, $SO_3H$, and $SO_3^-$, wherein, in certain embodiments, at least one of these substituents is $SO_3^-$, wherein, in certain other embodiments, only one of A, B, C, and D, A', B', C', and D', A", B", C", and D", A''', B''', C''', and D''' is substituted, wherein in other embodiments, only of A, B, C, and D, A', B', C', and D', A", B", C", and D", A''', B''', C''', and D''' is substituted with a group other than hydrogen, and in further embodiments only one of A, B, C, and D, A', B', C', and D', A", B", C", and D", A''', B''', C''', and D''' is substituted with $SO_3^-$;

wherein, in certain other embodiments, one (and only one) of A, B, C, or D is substituted with a group other than hydrogen, and wherein in certain embodiments that group is an $SO_3^-$ group, and only one of A', B', C', and D', A", B", C" is substituted with a group other than hydrogen, and wherein in certain embodiments that group is an $SO_3^-$ group, and wherein only one of A''', B''', C''', and D''' is substituted with a group other than hydrogen, and wherein in certain embodiments that group is an $SO_3^-$ group, wherein n is any suitable integer, wherein $n^-$ indicates the charge on the phthalo portion of the structure and n indicates the number of $NR_4^+$ components, in embodiments, wherein, n is mixture of from 0, 1, 2, 3, 4, or greater, wherein, in embodiments, n is a mixture of 0, 1, and 2;

wherein, in embodiments, the synergist comprises a mixture of compounds wherein n is a mixture of from 0, 1, 2, 3, 4, or greater, or wherein n is a mixture of 0, 1, and 2.

wherein R is independently selected from hydrogen, an alkyl group, including linear, branched, saturated, unsaturated, cyclic, substituted, and unsubstituted alkyl groups, and wherein hetero atoms, such as oxygen, nitrogen, sulfur, silicon, phosphorus, boron, may optionally be present in the alkyl group, having from about 1 to about 50 carbon atoms, wherein, if substituted, substitutions can be alkyl or phenyl, and wherein, in embodiments, R is an alkyl chain having 18 carbon atoms;

and wherein, in embodiments, the synergist comprises mixtures of compounds wherein n is 0, 1, 2, 3, 4 or greater; and wherein, in embodiments, n is a mixture of from 0, 1, 2, 3, 4, or greater, wherein, in embodiments, n is a mixture of 0, 1, and 2.

In embodiments, the synergist is a compound of the formula

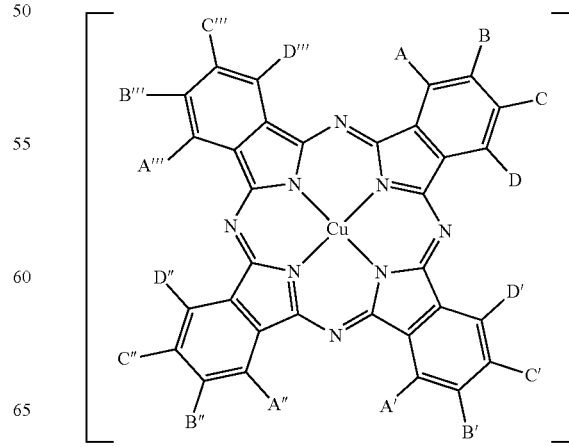

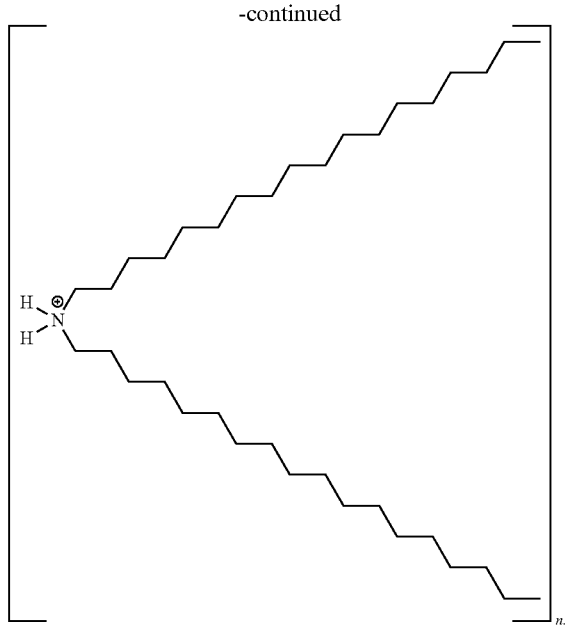

wherein A, B, C, and D, A', B', C', and D', A", B", C", and D", A'", B'", C'", and D'", are each independently selected from the group consisting of hydrogen and $SO_3^-$, provided that at least one of these substituents is $SO_3^-$, wherein n is an integer, in embodiments wherein n is an integer from 0, 1, 2, and wherein, in embodiments, the synergist comprises mixtures of compounds wherein n is 0, 1, or 2.

Dispersant.

The phase change ink compositions herein can contain a dispersant. Any suitable or desired dispersant can be employed. In embodiments, the dispersant can be a dispersant described in U.S. Pat. No. 7,973,186 of Adela Goredema, et al., which is hereby incorporated by reference herein in its entirety. In specific embodiments, the dispersant is a compound of the formula

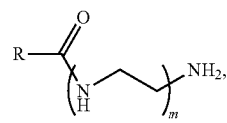

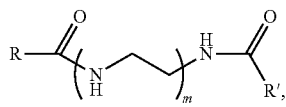

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

The dispersant can optionally be a polymeric dispersant such as those sold under the name Solsperse®, in embodiments, Solsperse® 1700, Solsperse® 32000, Solsperse® 13240, available from The Lubrizol Corporation.

The dispersant can be provided in the phase change ink composition in any suitable or desired amount. In embodiments, the dispersant can be present in an amount of from about 1 to about 500 percent, or from about 10 to about 300 percent, or from about 30 to about 200 percent total dispersant, based on the total weight of the pigment in the phase change ink composition.

Other Additives.

The ink may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX® 1098, available from BASF); 2,2-bis(4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl) isocyanurate (Aldrich); 2,2'-ethylidene bis(4,6-di-tert-butylphenyl)fluoro phosphonite (ETHANOX® 398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl)benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD® 76, NAUGARD® 445, NAUGARD® 512, and NAUGARD® 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The phase ink compositions of the present disclosure can be prepared by any desired or suitable method. In embodiments, a method for preparing a phase change ink composition herein comprises combining an amorphous compound; a crystalline compound; an optional colorant; an optional synergist; an optional dispersant; and a linear primary alcohol, to produce a phase change ink composition.

For example, the ink ingredients can be mixed together, followed by heating, to a temperature of at least about 100° C. to no more than about 140° C., although the temperature can be outside of this range, and stirring until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

In embodiments, an ink jet printer stick or pellet herein contains a phase change ink composition comprising an amorphous compound; a crystalline compound; an optional colorant; an optional synergist; an optional dispersant; and a linear primary alcohol.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

In embodiments, a method herein comprises incorporating into an ink jet printing apparatus a phase change ink composition as described herein; melting the ink composition; and causing droplets of the melted ink to be ejected in an imagewise pattern onto a substrate.

Any suitable substrate or recording sheet can be employed, including plain papers such as XEROX® 4024 papers, XEROX® Image Series papers, Courtland® 4024 DP® paper, ruled notebook paper, bond paper, silica coated papers such as Sharp Company silica coated paper, JuJo® paper, Hammermill® Laserprint Paper, and the like, transparency materials, fabrics, textile products, plastics, polymeric films, inorganic substrates such as metals and wood, and the like. In specific embodiments, the substrate comprises a coated paper.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

A phase change ink base was prepared as described in Table 2.

TABLE 2

| Ink Base Component | Crystalline Component | Amorphous Component |
|---|---|---|
| Structure | [diBn-HDI diurethane structure] | [di-menthyl tartrate structure] |
| Amount (wt %) | 80 | 20 |

Colored inks were prepared by adding an attrited pigment concentrate to the ink base. Formulation details are shown in Table 3.

TABLE 3

| | | Ink Example #, weight % | | |
|---|---|---|---|---|
| Component | Structure | 1 Control | 2 5% Unilin ™ 350 | 3 10% Unilin ™ 350 |
| diBn-HDI diurethane | [structure] | 76.5 | 72.48 | 68.48 |

TABLE 3-continued

| | | Ink Example #, weight % | | |
|---|---|---|---|---|
| Component | Structure | 1 Control | 2 5% Unilin ™ 350 | 3 10% Unilin ™ 350 |
| Di-DL-menthyl L-tartrate (DMT) | [structure] | 19.1 | 18.12 | 17.12 |
| Unilin ™ 350 | | 0.0 | 5.0 | 10.0 |
| B4G | Cyan pigment | 2.0 | 2.0 | 2.0 |
| SunFlo ® SFD-B124 | Synergist | 0.4 | 0.4 | 0.4 |
| Solsperse ® 32000 | Dispersant | 2.0 | 2.0 | 2.0 | diBn-HDI diurethane is a crystalline compound described at paragraph 91 hereinabove. See U.S. patent application Ser. No. 13/456,619.

Di-DL-menthyl L-tartrate (DMT) is an amorphous compound described at paragraph 60 hereinabove. See U.S. patent application Ser. No. 13/095,784.

B4G is HOSTAPERM® Blue B4G (commercially available from Clariant).

Sunflo® SFD-B124 is a derivatized sulfonated copper phthalocyanine, available from Sun Chemical.

Solsperse® 32000 is a polymeric dispersant available from The Lubrizol Corporation.

Linear polyethylene waxes are too non-polar for the present phase change ink vehicle. It was found that by using a linear primary alcohol, such as Unilin™ 350, available from Baker Hughes, the wax is rendered compatible with the phase change ink and provides images have superior image robustness.

Rheology of the Pigmented Inks.

The pigmented inks exhibited Newtonian viscosity and jettable viscosity (that is, ≤12 centipoise) at 140° C. FIG. 1 shows complex viscosity versus temperature for the control ink of Example 1 containing 0% Unilin™ 350, the ink Example 2 of the present disclosure containing 5% Unilin™ 350, and the ink Example 3 of the present disclosure containing 10% Unilin™ 350.

Figure 2:
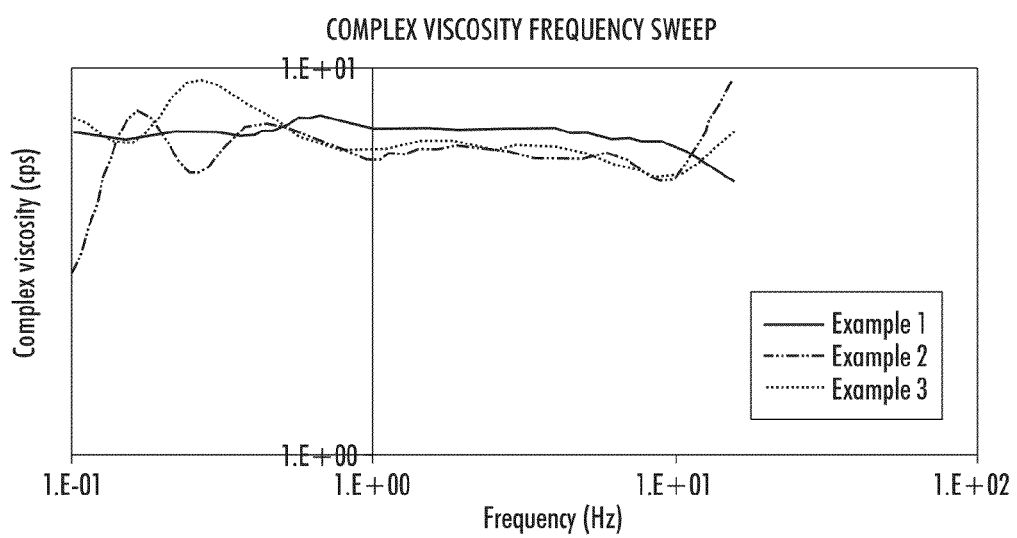
FIG. 2 is a graph showing complex viscosity (centipoise, y-axis) versus frequency (Hz, x-axis) at 140° C. for a control pigmented phase change ink and for two pigmented phase change inks in accordance with the present disclosure.

FIG. 2 shows complex viscosity versus frequency at 140° C. for the control ink of Example 1 containing 0% Unilin™ 350, the ink Example 2 of the present disclosure containing 5% Unilin™ 350, and the ink Example 3 of the present disclosure containing 10% Unilin™ 350.

Ink Print-Proofing and Robustness Testing.

K-proof samples were made on coated paper (DCEG: Xerox digital Color Elite Gloss, 120 gsm). K-proof samples Example 2 and Example 3 comprised inks incorporating 5 and 10 weight % Unilin™ 350, respectively. K-proof samples Example 1 comprised a "neat" pigmented ink but without addition of Unilin™ 350. The ink examples were prepared in the same manner as control samples. The K-proofs were spread by feeding each K-proof through a Xerox Phaser® 8400 or Phaser® 8860 printer at 1 inch per second at a drum and paper pre-heat temperature of 50° C. with the ink-surface facing the transfix drum. One K-proof of each ink was then scratched using the XRCC three-finger gouge system, and another K-proof folded along with a Xerox Business 4200 (75 gsm) facing page in a Duplo D-590 folder and evaluated for fold crease. A third K-proof was spread at increasing spreader drum and pre-heat temperatures until offset became apparent (spreader offset can be a limiting factor in what temperature certain print-process steps can be carried out, higher temperatures are better).

Figure 3:
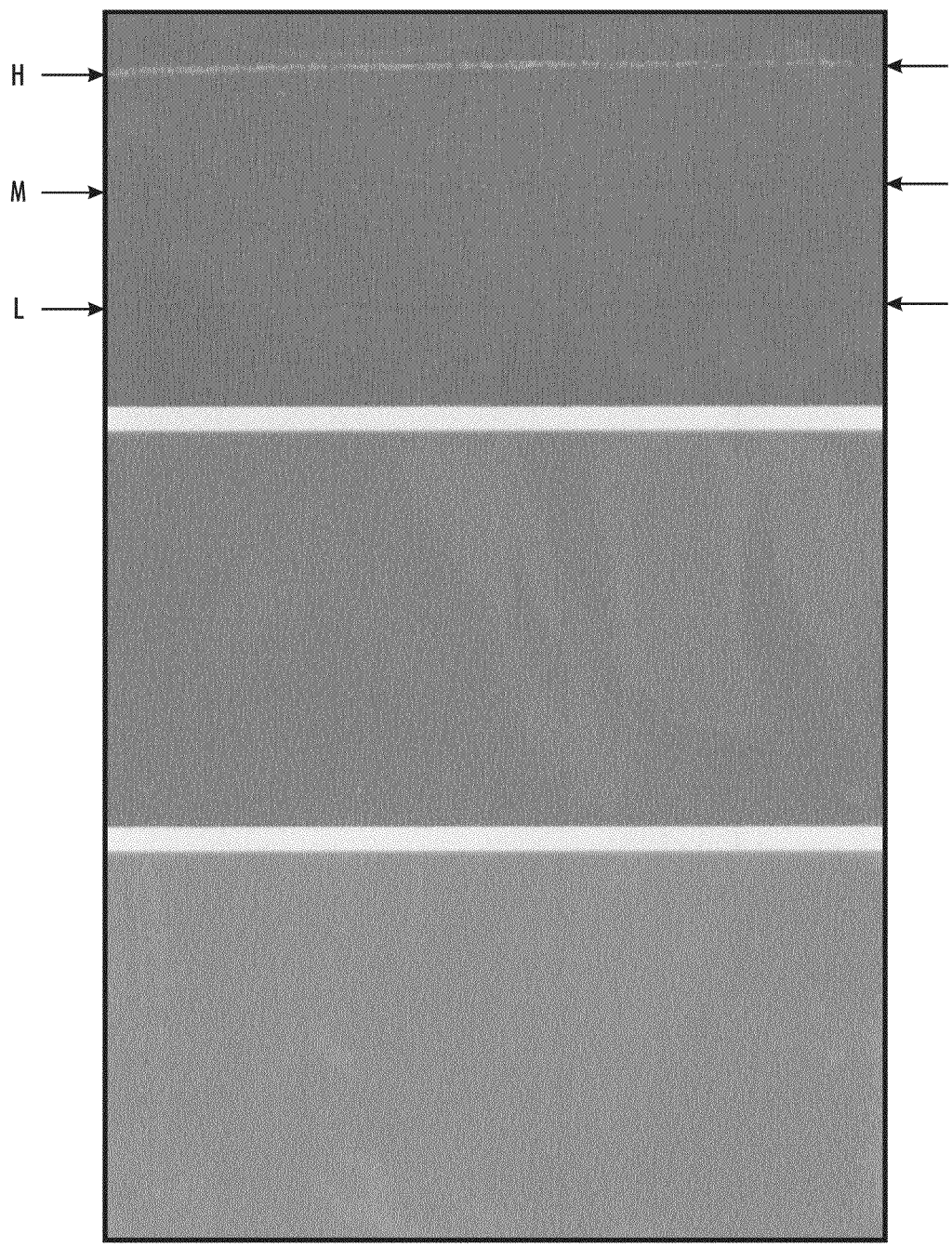
FIG. 3 shows a K-proof control sample scratched with a three-finger gouge tester.
Figure 4:
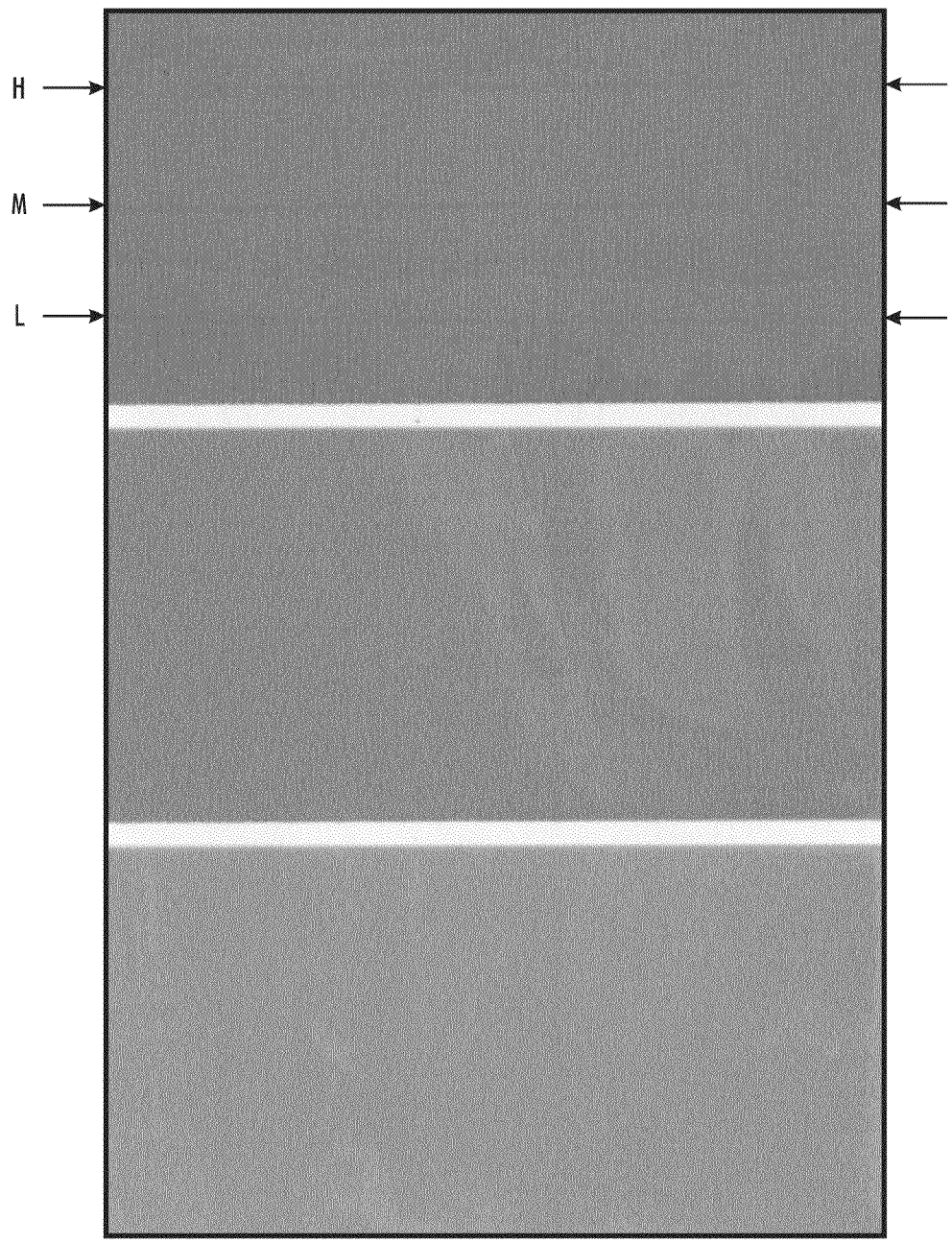
FIG. 4 shows a K-proof sample in accordance with the present disclosure scratched with a three-finger gouge tester.
Figure 5:
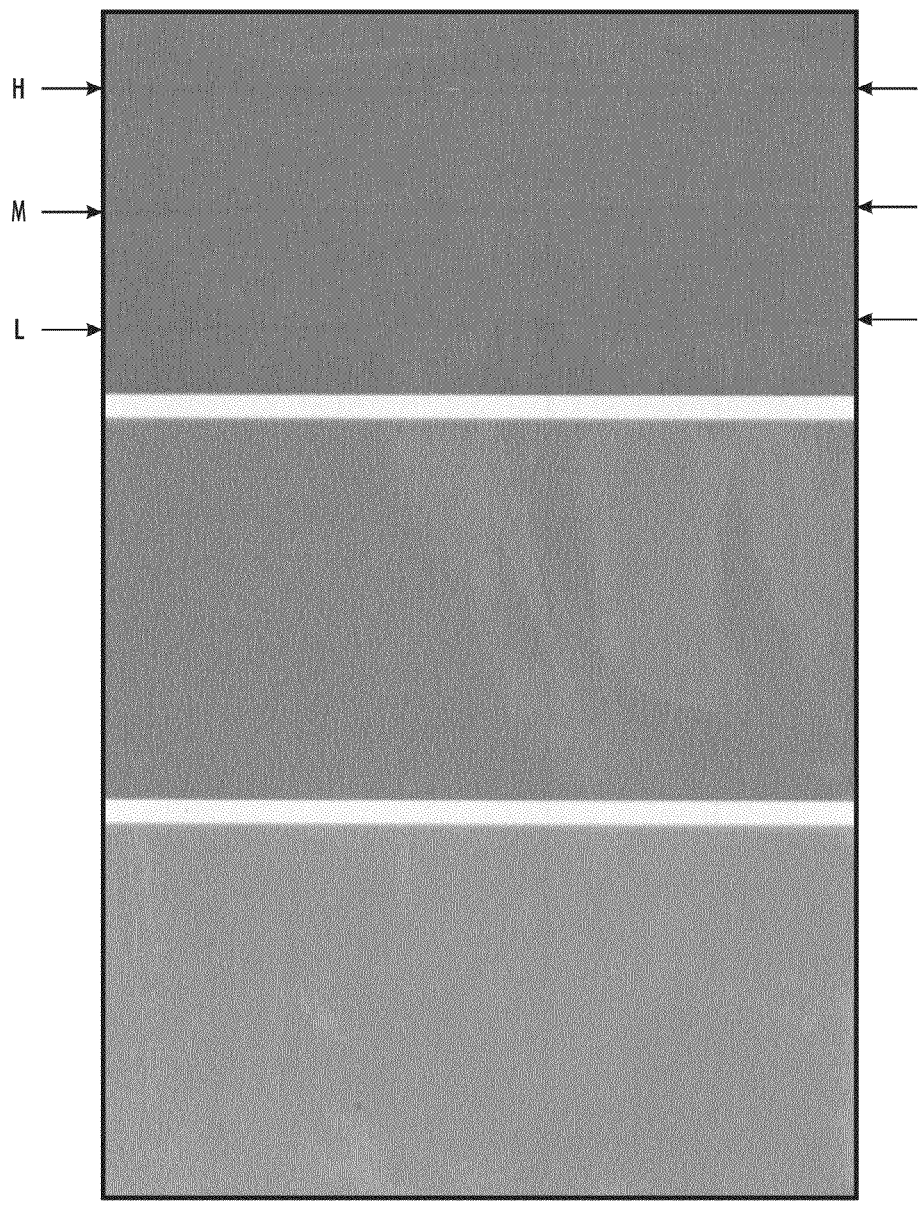
FIG. 5 shows a K-proof sample in accordance with the present disclosure scratched with a three-finger gouge tester.

Two K-proofs of each ink spread at 50° C. were visually assessed for scratch and fold crease area. FIGS. 3, 4, and 5 provided scanned images of K-proof samples scratched using the three-finger gouge test. FIG. 3 is a scanned image of a K-proof sample prepared with the control ink Example 1. FIG. 4 is a scanned image of a K-proof sample prepared with the ink of Example 2 containing 5 weight % Unilin™ 350. FIG. 5 is a scanned image of a K-proof sample prepared with the ink of Example 3 containing 10 weight % Unilin™ 350.

The cyan pigmented phase change ink of Example 1 does not yet meet the targeted performance for scratch, fold crease, or fold offset. The addition of Unilin™ 350 described herein provides one approach to further improvements in the robustness performance of cyan pigmented phase change inks. Scratch resistance and fold crease resistance are improved with the addition of Unilin™ 350 content in the total ink formulation.

Figure 6:
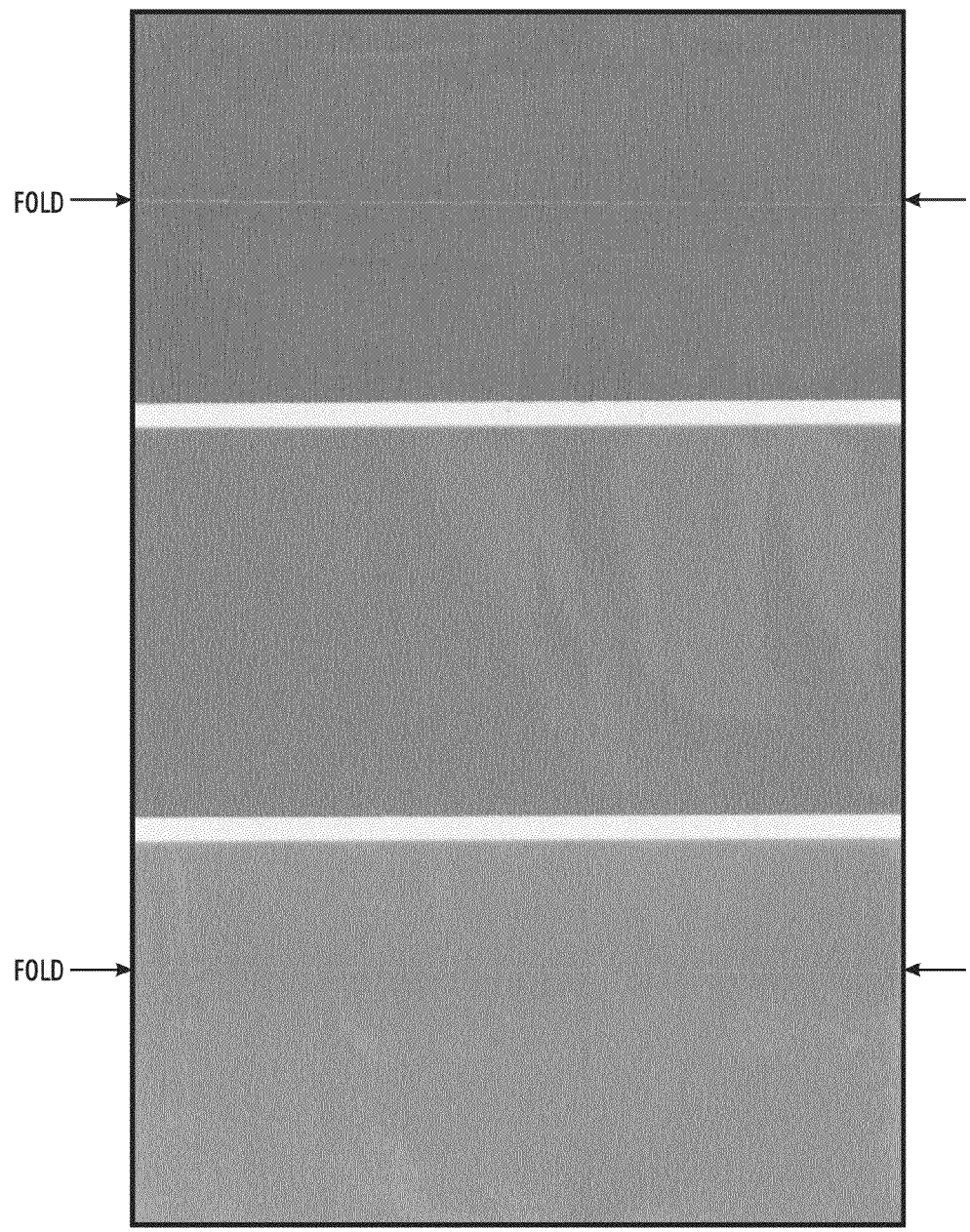
FIG. 6 shows a K-proof control sample folded with a facing page.
Figure 7:
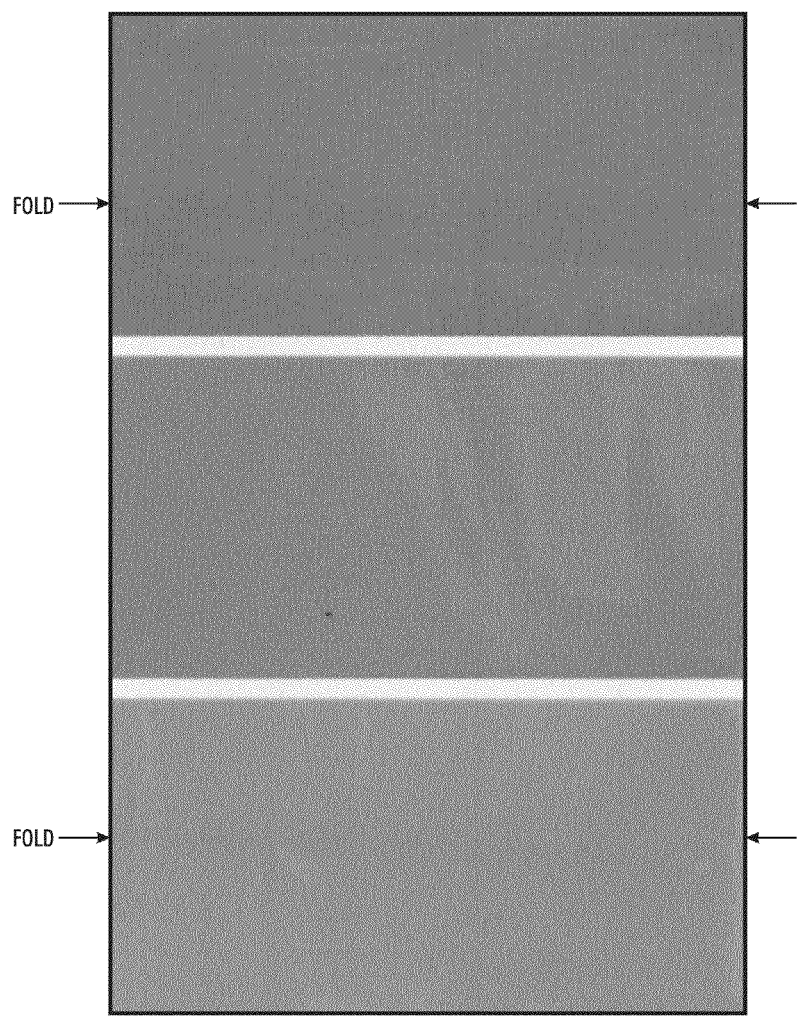
FIG. 7 shows a K-proof sample in accordance with the present disclosure folded with a facing page.
Figure 8:
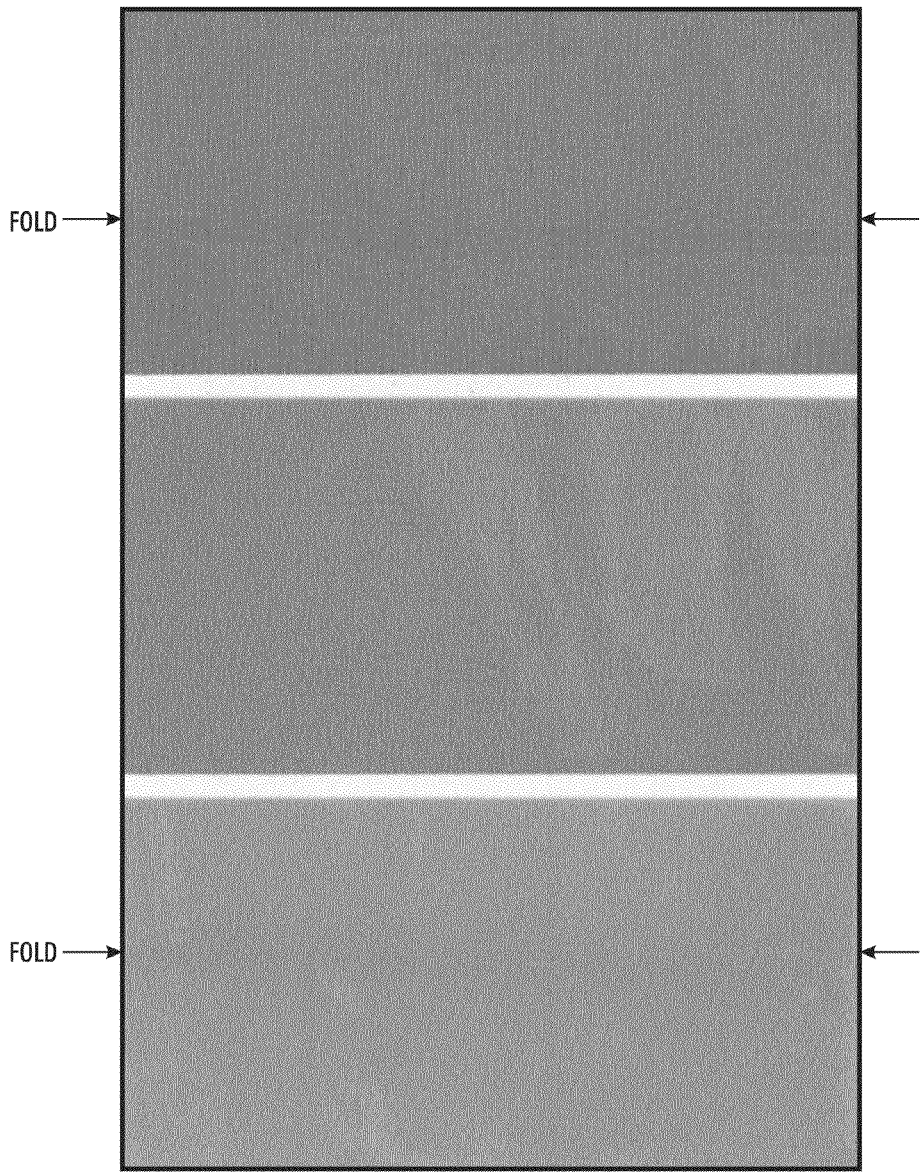
FIG. 8 shows a K-proof sample in accordance with the present disclosure folded with a facing page.

In comparing the scratched K-proofs in FIGS. 3, 4, and 5, the amount of ink removed and visibility of the scratches is improved significantly with the addition of Unilin™ 350, with 5% Unilin™ 350 producing the best scratch results. Considering the folded K-proofs in FIGS. 6, 7, and 8, a slight improvement in fold crease is seen with each iterative increase in additive loading, with the best result at 10% Unilin™ 350.

Examples 2 and 3 show that the use of Unilin™ 350 does not slow down the crystallization rate of the phase change inks. Table 5 provides crystallization data for the ink Examples 2 and 3 of the present disclosure.

TABLE 5

| Example | Ttest (° C.) | Time Crystallization Onset (seconds) | Time Crystallization Elapsed (seconds) | Total Time Crystallization Total (seconds) |
|---|---|---|---|---|
| 2 | 120 | 1 | 1 | 2 |
| 3 | 120 | 2 | 1 | 3 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink comprising:
an amorphous compound;
wherein the amorphous compound comprises a first ester of tartaric acid of the formula

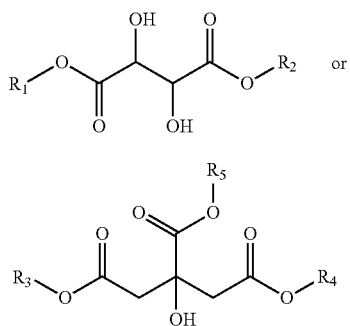

Formula I

Formula II wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group, and mixtures thereof;
a crystalline compound;
wherein the crystalline compound comprises a second ester of tartaric acid of the formula

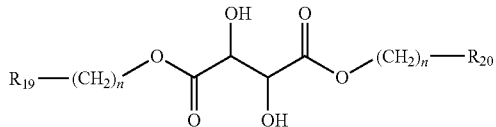

Formula IX wherein each $R_{19}$ and $R_{20}$ is independently an aryl or a heteroaryl optionally substituted with a lower alkyl and alkoxy, and each n is independently 0 to 3; or
wherein the crystalline compound is a compound of the formula Formula VII

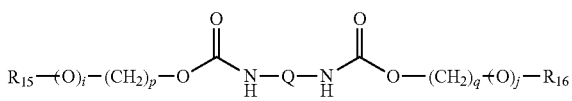

wherein Q is alkanediyl; each $R_{15}$ and $R_{16}$ is independently phenyl or cyclohexyl optionally substituted with one or more alkyl; i is 0 or 1; j is 0 or 1; p is 1 to 4; and q is 1 to 4;
an optional dispersant;
an optional synergist;
an optional colorant; and
an alcohol having a long alkyl chain containing from about 10 to about 80 carbon atoms.

2. The phase change ink of claim 1, wherein the amorphous compound comprises a first ester of tartaric acid of the formula

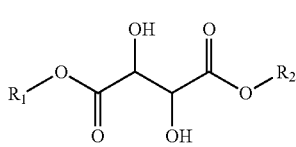

Formula I

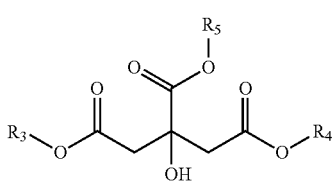

Formula II wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group, and mixtures thereof; and
wherein the crystalline compound comprises a second ester of tartaric acid of the formula

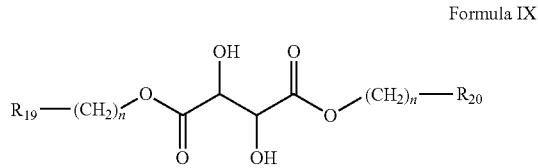

Formula IX wherein each $R_{19}$ and $R_{20}$ is independently an aryl or a heteroaryl optionally substituted with a lower alkyl and alkoxy, and each n is independently 0 to 3.

3. The phase change ink of claim 1, wherein the amorphous compound is selected from the group consisting of bis(2-isopropyl-5-methylcyclohexyl) L-tartrate, (4-t-butylcyclohexyl)(cyclohexyl)-L-tartrate, Di-DL-menthyl L-tartrate, stereoisomers and mixtures thereof.

4. The phase change ink of claim 1, wherein the amorphous compound is a compound of the formula

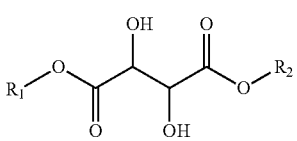

wherein $R_1$ and $R_2$ each, independently of the other, is selected from the group consisting of alkyl group, wherein the alkyl portion can be straight, branched or cyclic, saturated or unsaturated, substituted or unsubstituted, having from about 1 to about 40 carbon atoms or a substituted or unsubstituted aromatic or heteroaromatic group, and mixtures thereof.

5. The phase change ink of claim 1, wherein the crystalline compound is selected from the group consisting of dibenzyl L-tartrate, diphenethyl L-tartrate, bis(3-phenyl-1-propyl) L-tartrate, bis(2-phenoxyethyl) L-tartrate, diphenyl L-tartrate, bis-4-methylphenyl) L-tartrate, bis(4-methoxylphenyl) L-tartrate, bis(4-methylbenzyl) L-tartrate, bis(4-methoxybenzyl) L-tartrate, and stereoisomers and mixtures thereof.

6. The phase change ink of claim 1, wherein the crystalline compound comprises a second ester of tartaric acid of the formula Formula IX

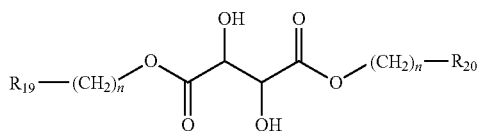

wherein of each $R_{19}$ and R20 is independently selected from the group consisting of

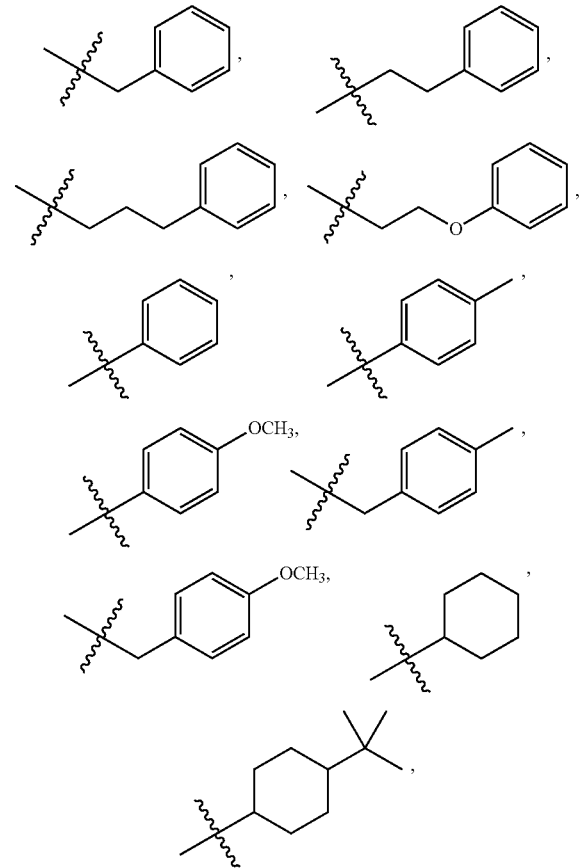

and mixtures thereof, wherein ⌇ represents the point of attachment of the $R_{19}$ and $R_{20}$ group to the compound.

7. The phase change ink of claim 1, wherein the crystalline compound is a compound of the formula Formula VII

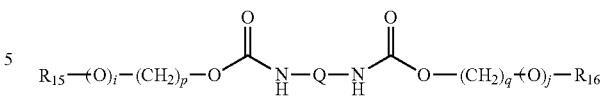

wherein Q is alkanediyl; each $R_{15}$ and $R_{16}$ is independently phenyl or cyclohexyl optionally substituted with one or more alkyl; i is 0 or 1; j is 0 or 1; p is 1 to 4; and q is 1 to 4.

8. The phase change ink of claim 1, wherein the crystalline compound is present in an amount of from about 60 to about 95 percent by weight based on the total weight of the phase change ink.

9. The phase change ink of claim 1, wherein the amorphous compound is present in an amount of from about 5 to about 40 percent by weight based on the total weight of the phase change ink.

10. The phase change ink of claim 1, wherein the dispersant a compound of the formula

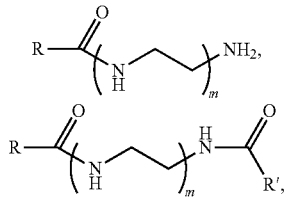

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

11. The phase change ink composition of claim 1, wherein the synergist is a compound of the formula

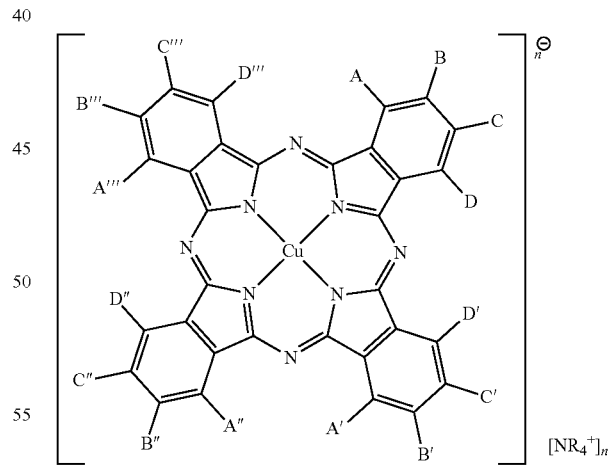

wherein A, B, C, and D, A', B', C', and D', A", B", C", and D", A''', B''', C''', and D''', are each independently selected from the group consisting of hydrogen, $SO_3H$, and $SO_3^-$, wherein R is selected from the group consisting of hydrogen and an alkyl group, and wherein the synergist comprises a mixture of compounds wherein n is a mixture of from 0, 1, 2, 3, 4, or greater, or wherein n is a mixture of 0, 1, and 2.

12. The phase change ink composition of claim 1, wherein the colorant is a pigment.

13. The phase change ink composition of claim 1, wherein the alcohol is a linear primary alcohol or a secondary alcohol.

14. The phase change ink composition of claim 1, wherein the alcohol is a linear primary alcohol having a long alkyl chain containing from about 15 to about 60 carbon atoms.

15. The phase change ink composition of claim 1, wherein the alcohol is a linear primary alcohol having a long alkyl chain containing from about 20 to about 55 carbon atoms.

16. The phase change ink composition of claim 1, wherein the alcohol is a linear primary alcohol having a melting point of from about 70 to about 130° C.

17. The phase change ink composition of claim 1, wherein the alcohol is a linear primary alcohol having a viscosity of about 1 to about 10 centipoise at a temperature of about 150° C.

18. The phase change ink composition of claim 1, wherein the alcohol is a linear primary alcohol having a hydroxyl number of from about 30 to about 180 mg KOH/g of sample.

19. An ink jet printer stick or pellet containing a phase change ink composition comprising an amorphous compound; a crystalline compound; an optional dispersant; an optional synergist; an optional colorant; and an alcohol having a long alkyl chain containing from about 10 to about 80 carbon atoms;

wherein the amorphous compound comprises a first ester of tartaric acid of the formula

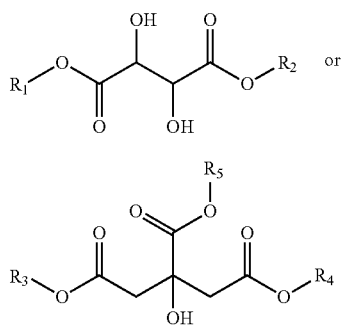

Formula I

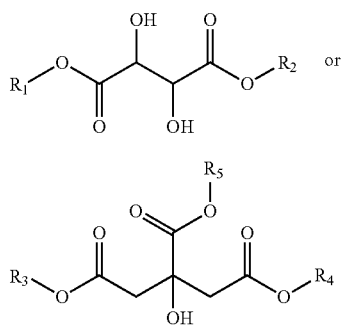

Formula II wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group, and mixtures thereof; and wherein the crystalline compound comprises a second ester of tartaric acid of the formula

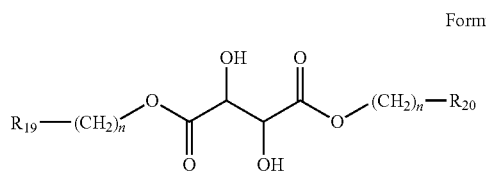

Formula IX wherein each $R_{19}$ and $R_{20}$ is independently an aryl or a heteroaryl optionally substituted with a lower alkyl and alkoxy, and each n is independently 0 to 3; or wherein the crystalline compound is a compound of the formula

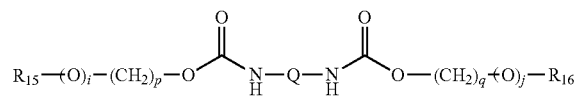

Formula VII wherein Q is alkanediyl; each $R_{15}$ and $R_{16}$ is independently phenyl or cyclohexyl optionally substituted with one or more alkyl; i is 0 or 1; j is 0 or 1; p is 1 to 4; and q is 1 to 4.

20. A method comprising:

incorporating into an ink jet printing apparatus a phase change ink composition comprising an amorphous compound; a crystalline compound; an optional dispersant; an optional synergist; an optional colorant; and an alcohol having a long alkyl chain containing from about 10 to about 80 carbon atoms;

wherein the amorphous compound comprises a first ester of tartaric acid of the formula

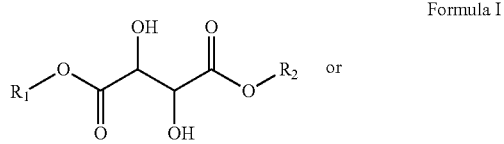

Formula I

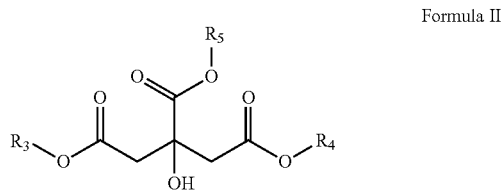

Formula II wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group, and mixtures thereof; and wherein the crystalline compound comprises a second ester of tartaric acid of the formula

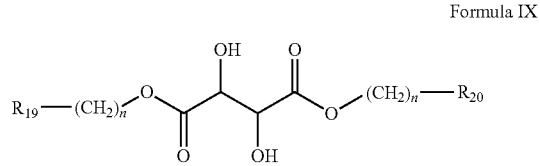

Formula IX wherein each $R_{19}$ and $R_{20}$ is independently an aryl or a heteroaryl optionally substituted with a lower alkyl and alkoxy, and each n is independently 0 to 3; or wherein the crystalline compound is a compound of the formula Formula VII
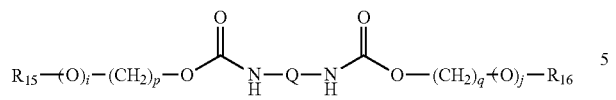
wherein Q is alkanediyl; each $R_{15}$ and $R_{16}$ is independently phenyl or cyclohexyl optionally substituted with one or more alkyl; i is 0 or 1; j is 0 or 1; p is 1 to 4; and q is 1 to 4;
   melting the ink composition; and
   causing droplets of the melted ink to be ejected in an imagewise pattern onto a substrate.
\* \* \* \* \*